United States Patent
Hashimoto

(10) Patent No.: US 7,914,712 B2
(45) Date of Patent: Mar. 29, 2011

(54) CELLULOSE ACYLATE FILM, POLARIZING PLATE, OPTICAL COMPENSATION FILM, AND LIQUID CRYSTAL DISPLAY DEVICE USING THE SAME

(75) Inventor: Kiyokazu Hashimoto, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 724 days.

(21) Appl. No.: 11/912,419

(22) PCT Filed: May 24, 2006

(86) PCT No.: PCT/JP2006/310364
§ 371 (c)(1),
(2), (4) Date: Nov. 2, 2007

(87) PCT Pub. No.: WO2006/126592
PCT Pub. Date: Nov. 30, 2006

(65) Prior Publication Data
US 2009/0023911 A1    Jan. 22, 2009

(30) Foreign Application Priority Data

May 24, 2005   (JP) .................................. 2005-150333
Feb. 8, 2006   (JP) .................................. 2006-030694

(51) Int. Cl.
*B29D 7/01*    (2006.01)
(52) U.S. Cl. ......... 264/1.34; 264/1.6; 264/207; 264/208
(58) Field of Classification Search ................. 264/1.34, 264/1.6, 207, 208; 536/63, 64, 65, 68
See application file for complete search history.

(56) References Cited

U.S. PATENT DOCUMENTS

| 6,984,730 B2 * | 1/2006 | Yamada et al. ................ 536/56 |
| 7,671,193 B2 * | 3/2010 | Shibata et al. ................ 536/69 |
| 2004/0052977 A1 * | 3/2004 | Ogawa et al. ................ 428/1.1 |

FOREIGN PATENT DOCUMENTS

| EP | 1341008 A1 | 9/2003 |
| JP | 9-241425 (A) | 9/1997 |
| JP | 2000-352620 (A) | 12/2000 |
| JP | 2006-183004 (A) | 7/2006 |
| JP | 2006-205708 (A) | 8/2006 |

OTHER PUBLICATIONS

Eastman "Propperty Groups Comparisons—Typical Physical Properties—Cellulose Esters", (2010).*
Grunert et al, "Nanocomposites of Cellulose . . . ", Journal of Polymers and the Environment, (Apr. 2002).*
Form PCT/ISA/210 (International Search Report) dated Aug. 29, 2006.
Form PCT/ISA/237 (Written Opinion of the International Searching Authority) dated Aug. 29, 2006.
Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2006/310364, Sep. 18, 2008, The International Bureau of WIPO, Geneva, CH.

* cited by examiner

*Primary Examiner* — David M Brunsman
(74) *Attorney, Agent, or Firm* — Buchanan Ingersoll & Rooney PC

(57) ABSTRACT

A cellulose acylate film characterized in that it has a shear rate dependency of melt viscosity of 0.1 to 2 and/or a temperature dependency of melt viscosity of 0.1 to 3. The cellulose acylate film is capable of suppressing generation of cutting wastage at the time of cutting.

12 Claims, 1 Drawing Sheet

CELLULOSE ACYLATE FILM, POLARIZING PLATE, OPTICAL COMPENSATION FILM, AND LIQUID CRYSTAL DISPLAY DEVICE USING THE SAME

This application is a 371 of PCT/JP2006/310364, filed May 24, 2006.

TECHNICAL FIELD

The present invention relates to a cellulose acylate film which is formed by melting/flow casting to be suitable for an optical film, a polarizing plate, an optical compensatory film, an anti-reflection film, and a liquid crystal display device using the same.

BACKGROUND ART

Heretofore, in producing cellulose acylate films for use in liquid-crystal image display devices, a solution-casting method has been principally carried out, which comprises dissolving cellulose acylate in a chlorine-containing organic solvent such as dichloromethane, casting it on a substrate, and drying it to form a film. Dichloromethane, a type of a chlorine-containing organic solvent has been favorably used as a solvent for cellulose acylate, since it is a good solvent for cellulose acylate and has a low boiling point (about 40° C.), therefore having the advantage of easy vaporization in a film formation step and in a drying step.

Recently, in terms of environment conservation, the leakage of a chlorine-containing organic solvent having a low boiling point is remarkably reduced in a treatment process even in a hermetically closed equipment. For example, the organic solvent was prevented from leaking using a completely closed system or a method of sucking and processing the organic solvent by providing a gas absorbing tower before emitting the organic solvent to outer air although the organic solvent leaks was performed. In addition, the organic solvent is hardly discharged by the decomposition of the chlorine-containing organic solvent using electron beams or combustion due to heating before the discharge, but complete non-discharge need to be further studied.

As such a countermeasure, a method of melting cellulose acylate without an organic solvent and forming a film was suggested (for example, see Patent Document 1). This is to easily melt and form the film by lengthening a carbon chain of an ester group of the cellulose acylate and decreasing a melting point. In more detail, it is possible to melt and form the film by converting cellulose acetate into cellulose propionate or cellulose butylate. However, when the film molten and formed by the above-described method is cut in order to manufacture a polarizing plate, cutting wastage generates and attaches to the film. Accordingly, there is a need for improvement of the cellulose acylate film manufactured by the melt-casting film formation such that the cutting wastage is hard to generate at the time of cutting.

Patent Document 1: JP-A-2000-352620

DISCLOSURE OF THE INVENTION

Problems to be Solved by the Invention

An object of the present invention is to provide a cellulose acylate film capable of suppressing generation of cutting wastage at the time of cutting, a polarizing plate, a optical compensatory film, an anti-reflection film, and a liquid crystal display device using the same.

Means for Solving the Problems

The object of the present invention is accomplished by the following matters.

[1] A cellulose acylate film having a shear rate dependency of melt viscosity of 0.1 to 2.
[2] A cellulose acylate film having a temperature dependency of melt viscosity of 0.1 to 3.
[3] The cellulose acylate film according to [1] or [2], wherein cellulose acylate included in the cellulose acylate film satisfies following Formulae (1) to (3).

$2.0 \leq X+Y \leq 3.0$        Formula (1)

$0 \leq X \leq 2.0$        Formula (2)

$1.2 \leq Y \leq 2.9$        Formula (3)

where, in Formulae (1) to (3), X represents a substitution degree for an acetyl group, and Y represents the sum of substitution degrees for a propionyl group, a butyryl group, a pentanoyl group, and a hexanoyl group.

[4] The cellulose acylate film according to any one of [1] to [3], which is produced by a melt-casting film formation with use of a touch roll.
[5] The cellulose acylate film according to any one of [1] to [4], wherein the cellulose acylate film is drawn by 1% to 300% in at least one direction.
[6] A polarizing plate comprising at least one layer of the cellulose acylate film according to the cellulose acylate film according to any one of [1] to [5] laminated on a polarizer.
[7] An optical compensatory film using the cellulose acylate film according to any one of [1] to [5].
[8] An anti-reflection film using the cellulose acylate film according to any one of [1] to [5].
[9] A liquid crystal display device using at least one of the polarizing plate according to [6], the optical compensatory film according to [7], and the anti-reflection film according to [8].

Advantageous Effects of the Invention

According to the present invention, it is possible to provide a cellulose acylate film capable of suppressing generation of cutting wastage at the time of cutting, a polarizing plate, an optical compensatory film, an anti-reflection film, and a liquid crystal display device using the same.

BEST MODE FOR CARRYING OUT THE INVENTION

Figure 1:
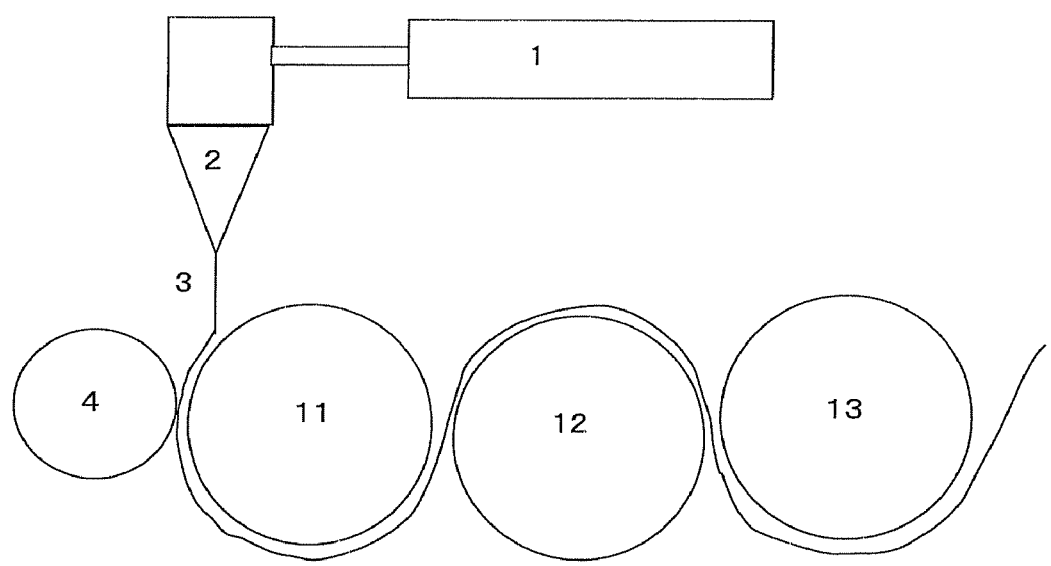
FIG. 1 is a schematic diagram showing the configuration of an apparatus for preparing a film by a melt-casting film formation, which includes a touch roll and a casting roll. In the drawing, a reference numeral 1 denotes an extruding machine, 2 denotes a die, 3 denotes a molten material (melt), 4 denotes a touch roll, and 11 to 13 denote casting rolls.

The cellulose acylate grains, the cellulose acylate film, and their production methods and their applications are described in detail hereinunder. The description of the constitutive elements of the invention given hereinunder may be for some typical embodiments of the invention, to which, however, the invention should not be limited. It should be noted that, in this description, any notation using a word "to" indicates a range defined by values placed before and after such word, where both ends of such range are included as minimum and maximum values.

In the present invention, such a cutting failure results from ununiformity of the film which occurs during forming the film as follows.

In a melt-casting film formation, resin molten by a melt extruder is extruded from a die, is cooled on a casting drum to become solidified, thereby forming a film. At this time, the following ununiform structure is formed in the die.

1) Shear Rate Dependency of Melt Viscosity

Resin is extruded by passing through a horizontally long rectangular slit of the die. At this time, the surfaces of the resin which contacts the slit of the die (the vicinities of the both surfaces of the extruded film) have a low shear rate and the center thereof (the center of the thickness direction of the film) has a high shear rate. The cellulose acylate forms a hydrogen bond between remaining hydroxyl groups to increase melt viscosity. Accordingly, if the shear rate is high, the hydrogen bond is broken and the melt viscosity is reduced (breaking of structural viscosity).

Since the shear rate of the vicinity of the surface is low and the melt viscosity is apt to be increased, cellulose acylate molecules are hard to flow and thus an alignment is difficult. In contrast, since the shear rate of the inside of the resin is high and the melt viscosity is apt to be decreased, the cellulose acylate molecules are easy to flow and thus the alignment is easy in a flow direction. The both surfaces have a low alignment and a soft structure and the center has a high alignment and a hard structure. As a result, when the cellulose acylate film is cut, stress concentration is apt to occur in the interface between the hard center and the soft surface and the interface is apt to be broken. Accordingly, the broken wastage becomes the cutting wastage.

2) Temperature Dependency of Melt Viscosity

In the temperature of the molten resin which passes through the die, the temperature of the surfaces of the resin which contact the slit (the vicinities of the both surfaces of the extruded film) is low and the temperature of the center thereof (the center of the thickness direction of the film) is high. This is because the surfaces of the resin contact outer air and thus the temperature of the die is apt to be decreased, but the inside of the resin has a low heat radiation property and thus the temperature thereof is hard to be decreased. The melt viscosity has temperature dependency. In general, as the temperature decreases, the melt viscosity becomes increased. However, if this tendency is strong, the melt viscosity in the vicinity of the surface is apt to be increased and flowability deteriorates. Thus, the cellulose acylate is hard to be aligned. In contrast, since the temperature of the center is high, the melt viscosity is apt to be decreased and the cellulose acylate is apt to flow. Thus, the cellulose acylate is apt to be aligned in the flow direction. As a result, the surfaces of the resin become soft and the inside of the resin becomes hard and thus the cutting wastage is apt to generate, similar to the above.

Accordingly, from the viewpoint of 1), the cellulose acylate film according to a first aspect of the present invention has a shear rate dependency of the melt viscosity of 0.1 to 2. In addition, the viewpoint from 2), the cellulose acylate film according to a second aspect of the present invention has a temperature dependency of the melt viscosity of 0.1 to 3.

That is, the cellulose acylate film according to the present invention satisfies at least one of conditions (1) and (2).

Condition (1): The shear rate dependency of the melt viscosity is 0.1 to 2.

Condition (2): The temperature dependency of the melt viscosity is 0.1 to 3.

The cellulose acylate film according to the present invention satisfies any one of the conditions (1) and (2) (hereinafter, referred to as the "condition of the present invention") and more preferably satisfies the both conditions.

As described above, the cellulose acylate film according to the present invention is characterized in that the shear rate dependency and the temperature dependency of the melt viscosity of the cellulose acylate are reduced.

(Shear Rate Dependency of Melt Viscosity)

In the condition (1) of the present invention, the shear rate dependency of the melt viscosity is 0.1 to 2, preferably 0.3 to 1.7, and more preferably 0.5 to 1.5. If the shear rate dependency of the melt viscosity is less than 0.1, the melt (molten resin) is hard to be leveled at the exit of a T-die and thus the deterioration of the surface is apt to occur due to flow ununiformity. This is because, although the resin is extruded from the T-die and the shear rate is decreased, the melt viscosity does not increase and thus the melt is apt to flow to cause the flow ununiformity. If the shear rate dependency of the melt viscosity is greater than 2, a difference in flow (alignment) due to a difference in viscosity occurs in the surface of the melt at the exit of the T-die and thus the cutting wastage is apt to generate at the time of cutting. The "shear rate dependency of the melt viscosity" described herein is expressed by a log of a ratio $(\log(\eta 1/\eta 100))$ of a melt viscosity $\eta 1$ at a shear rate 1 (/sec) to a melt viscosity $\eta 100$ at a shear rate 100 (/sec) measured at 220° C. The melt viscosity at the shear rate 1 (/sec) is preferably 100 Pa·s to 10000 Pa·s, more preferably 200 Pa·s to 5000 Pa·s, and most preferably 300 Pa·s to 3000 Pa·s. The melt viscosity at the shear rate 100 (/sec) is preferably 1 Pa·s to 7900 Pa·s, more preferably 2 Pa·s to 3900 Pa·s, and most preferably 3 Pa·s to 2800 Pa·s.

Above mentioned control of viscosity were achieved by controlling the polymerization degree of the cellulose acylate. Referring to the polymerization degree of the cellulose acylate preferred for use by the invention, its number-average polymerization degree is in the range of 120 to 400, preferably in the range of 150 to 300, and more preferably in the range of 180 to 260. Its average polymerization degree can be determined by e.g. the limiting viscosity method of UDA et al (Kazuo UDA and Hideo SAITO: Journal of the Society of Fibers, Vol. 18, No. 1, pages 105 to 120, 1962), or a method of determining a molecular weight distribution by gel permeation chromatography (GPC). For further details, reference is made to JP-A-9-95538.

(Temperature Dependency of Melt Viscosity)

In the condition (2) of the present invention, the temperature dependency of the melt viscosity is 0.1 to 3, preferably 0.3 to 2.5, and more preferably 0.5 to 2. If the temperature dependency of the melt viscosity is less than 0.1, the melt (molten resin) is hard to be leveled at the exit of a T-die and thus the deterioration of the surface is apt to occur due to flow ununiformity. This is because, although the resin is extruded from the T-die and the shear rate is decreased, the melt viscosity does not increase and thus the melt is apt to flow to cause the flow ununiformity. If the temperature dependency of the melt viscosity is greater than 3, a difference in flow (alignment) due to a difference in viscosity occurs in the surface of the melt at the exit of the T-die and thus the cutting wastage is apt to generate at the time of cutting. The "temperature dependency of the melt viscosity" described herein is expressed by a log of a ratio $(\log(\eta 190/\eta 240))$ of a melt viscosity $\eta 190$ measured at 190° C. to a melt viscosity $\eta 240$ measured at 240° C. The melt viscosity $\eta 240$ at 240° C. is preferably 1 Pa·s to 100 Pa·s, more preferably 3 Pa·s to 80

Pa·s, and most preferably 5 Pa·s to 50 Pa·s. The melt viscosity η190 at 190° C. is preferably 1.3 Pa·s to 100000 Pa·s, more preferably 3.8 Pa·s to 80000 Pas, and most preferably 6.3 Pa·s to 50000 Pa·s.

As described above, in order to allow the cellulose acylate to satisfy the condition of the present invention, it is preferable that (A) the 6-position acyl substitution degree of the cellulose acylate is equal to or greater than 0.9, (B) an acyl group satisfies predetermined conditions, (C) the quantity of remaining sulfuric acid in the cellulose acylate is 0 ppm to 100 ppm, (D) the cellulose acylate includes at least one of acetic acid, propionic acid, butyric acid and valeric acid by 1 ppm to 500 ppm, or (E) the cellulose acylate includes alkali metal ions by 1 ppm to 200 ppm.

(A) Cellulose Acylate of which the 6%-Position Acyl Substitution Degree is Equal to or Greater than 0.9

The cause for varying the shear rate or the temperature by the melt viscosity results from a hydrogen bond between hydroxyl groups of the cellulose acylate. That is, since the hydrogen bond is broken by the temperature or the shear, the viscosity is reduced, the melt viscosity is reduced, and, as a result, the dependency on the shear rate or the temperature increases. Accordingly, it is preferable that the hydrogen bond is not formed between the hydroxyl groups. However, if all the hydroxyl groups of the cellulose acylate are acylated, it is not preferable that a hydrophobic property is too high. Accordingly, the hydrogen bond needs to be efficiently reduced while maintaining a desired acylation ratio.

The hydroxyl groups are included in the 2-, 3-, and 6-positions of the cellulose acylate. Among them, it is efficient that the 6-position hydroxyl group is reduced in order to satisfy the condition of the present invention. This is because, while the 2- and 3-positions are directly coupled to a glucopyranose ring and thus the mobility thereof is low, the 6-position is coupled to the glucopyranose ring via a methylene group, the mobility thereof is high, and thus the hydrogen bond is likely to be formed. The 6-position acylation degree of the cellulose acylate is preferably 0.9 to 1, more preferably 0.91 to 0.99, and most preferably 0.92 to 0.98. The cellulose acylate may be synthesized as follows.

A basic principle of a method for producing these cellulose acylates is described in Migita et al's Wood Chemistry, pp. 180-190 (by Kyoritsu Publishing, 1968). The raw material for cellulose is preferably originated from hardwood pulp, softwood pulp, and cotton liner. As the raw material for cellulose, it is preferable to use a high-purity material in which the content of α-cellulose is in the range of 92 to 99.9% by mass. In a case where the raw material for cellulose has a sheet form or a block form, it is preferable that the raw material for cellulose is dissolved in advance, and it is preferable that the dissolution continues until the form of cellulose is to be a feathery form from a powdery form.

Before acylation, it is preferable that the raw material for cellulose is treated to be contacted to an activating agent (activation). It is possible to use a carboxylic acid or water as an activating agent. Preferable examples of the carboxylic acid as an activating agent include a carboxylic acid having carbon atoms in the range of 2 to 7 (for example, acetic acid, propionic acid, butyric acid, 2-methylpropionic acid, valeric acid, 3-methylbutyric acid, 2-methylbutyric acid, 2,2-dimethylpropionic acid (pivalic acid), hexane acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptane acid, and cyclohexanecarboxylic acid, and benzoic acid), more preferable examples of the carboxylic acid include acetic acid, propionic acid, or butyric acid, and even more preferable example of the carboxylic acid includes acetic acid. Two kinds or more of activating agents may be combined for use herein, or a carboxylic acid anhydride may be also for use herein.

The activating agent may be added at any adjusted temperature, and may be added in a spray manner, a falling-drop manner, a dipping manner or the like, selectively.

At the time of activation, a catalyst for activation such as a sulfuric acid may be also added as required, and is added in cellulose in a proportion of preferably 0.1 to 10% by mass. The activating agent is added in cellulose in a proportion of preferably 5% by mass or more, more preferably 10% by mass or more, and even more preferably 30% by mass or more. Time for activation is preferably 20 minutes or more, and the upper limit thereof is not particularly limited so long as the upper limit has no effect on the productivity. However, the upper limit is preferably 72 hours or less, more preferably 24 hours or less, and even more preferably 12 hours or less. The activation temperature is preferably in the range of 0 to 90° C., more preferably in the range of 15 to 80° C., and even more preferably in the range of 20 to 60° C.

In the present invention, when the cellulose acylate is synthesized, acylation is performed after activation. A representative acylation method is a liquid phase acetification method using an acetic anhydride-acetic acid-sulfuric acid catalyst. In detail, a cellulose raw material such as wood pulp is pretreated with a proper quantity of organic acid, is contained in an acylation mixture cooled previously to be esterified, and the complete cellulose acylate (the sum of the 2-, 3- and 6-position acyl substitution degrees is substantially 3.00) is synthesized. The acyl mixture generally includes organic acid as a solvent, organic acid anhydride as an esterification agent, and sulfuric acid as a catalyst. The quantity of organic acid anhydride is stoichiometrically larger than that of the sum of the quantities of water included in the system and cellulose reacting to the organic acid anhydride. After the acylation reaction is completed, for the hydrolysis of excess of organic acid anhydride included in the system and neutralization of the esterification catalyst, an aqueous solution of a neutralizing agent (e.g. calcium, magnesium, iron, aluminum, or zinc carbonate, acetate salt, or oxide) is added.

Next, the obtained complete cellulose acylate is maintained at 50 to 90° C. under the existence of a small quantity of an acetification reaction catalyst (generally, remaining sulfuric acid) to perform saponification and is converted into cellulose acylate having a desired acyl substitution degree and polymerization degree. At a time point when the desired cellulose acylate is obtained, the catalyst which remains in the system is completely neutralized using the neutralization agent or a cellulose acylate solution is contained in water or dilute sulfuric acid (or water or dilute sulfuric acid is contained in the cellulose acylate solution) to separate the cellulose acylate without neutralization, and cleaning and stabilizing processes are performed, thereby obtaining cellulose acylate.

In the general cellulose acylate synthesizing method, the 2- or 3-position acyl substitution degree is higher than the 6-position acyl substitution degree. In contrast, in the cellulose acylate according to the present invention, the 2 or 3-position acyl substitution degree is lower than the 6-position acyl substitution degree. As the synthesis condition of the cellulose acylate, a method disclosed in Japanese Unexamined Patent Application Publication No. 11-5851, Japanese Unexamined Patent Application Publication No. 2002-212338 or Japanese Unexamined Patent Application Publication No. 2002-338601 may be used for the synthesis of cellulose acylate having a large 6-position substitution degree.

The cellulose acylate according to the present invention can be manufactured by the following method. First, when cellulose acylate is matured under the existence of an acyl-group donor and a catalyst and water or alcohol of 0.1 to 10 mol % (0.1 mol % or more and less than 10 mol %) of the acyl-group donor, the 2-, 3- and 6-position acyl substitution degrees can be easily and properly adjusted. That is, if the quantity of water or alcohol is equal to or greater than 10 mol % of the acyl-group donor, an acyl group is apt to be separated from cellulose acylate having high substitution degrees (of which the sum of all the high acyl substitution degrees is 2.0 or more). In contrast, if the quantity of water or alcohol is reduced to be less than 10 mol % (preferably, less than 7 mol %) of the acyl-group donor, the acylation reaction of a liberated hydroxyl group (in particular, 6-position hydroxyl group) is dominant with respect to the separation reaction. Accordingly, when the quantity of water or alcohol is adjusted to be less than 10 mol % of the acyl-group donor, the reaction between the acyl-group donor and the cellulose acylate is reversible. That is, when a balance condition between the acyl-group donor and a glucose unit having a hydroxyl group which does not react to the 2-, 3, or 6-position is adjusted, the 2-, 3- and 6-position acetyl substitution degree can be efficiently adjusted.

(B) Cellulose Acylate Composing the Cellulose Acylate Film of Which the Cellulose Acylate Satisfies the all Following Formulae (1) to (3).

Preferably, the cellulose acylate for use in the invention satisfies the following formulae (1) to (3), as it may reduce fine projections and depressions in its film. In particular, Y is preferably at least 0.3.

$2.0 \leq X+Y \leq 3.0$, Formula (1)

$0 \leq X \leq 2.0$, Formula (2)

$1.2 \leq Y \leq 2.9$; Formula (3)

wherein X represents a substitution degree for an acetyl group; Y represents a total substitution degree for a propionyl group, a butyryl group, a pentanoyl group and a hexanoyl group.

The cellulose acylate of the invention more preferably satisfies all the following formulae (4) to (6) and even more preferably satisfies all the following formulae (7) to (9):

$2.4 \leq X+Y \leq 3.0$, Formula (4)

$0.05 \leq X \leq 1.8$, Formula (5)

$1.3 \leq Y \leq 2.9$. Formula (6)

$2.5 \leq X+Y \leq 2.95$, Formula (7)

$0.1 \leq X \leq 1.6$, Formula (8)

$1.4 \leq Y \leq 2.9$. Formula (9)

It is preferable that an acyl group selected from a propionyl group, a butyryl group, a pentanoyl group, and a hexanoyl group is introduced into the cellulose acylate. These groups have a volume larger than that of the acetyl group and thus suppress the formation of the hydrogen bond in the cellulose acylate. Accordingly, it is possible to suppress the formation of structural viscosity and reduce the temperature and shear rate dependency of the melt viscosity. Among them, the propionyl group and the butyryl group are more preferable.

One kind or at least two kinds of cellulose acylate may be used. A high-molecular component may be properly mixed, instead of the cellulose acylate.

(C) Cellulose Acylate in which the Quantity of Remaining Sulfuric Acid is 0 Ppm to 100 ppm Remaining sulfuric acid is included in the cellulose acylate as a synthesis catalyst. The remaining sulfuric acid decomposes an ester bond when the cellulose acylate is molten. In particular, the 6-position acyl group is apt to be decomposed due to high activity. As a result, the hydrogen bond is formed in the cellulose acylate and thus the shear rate and temperature dependency of the melt viscosity increase.

Accordingly, the quantity of the remaining sulfuric acid in the cellulose acylate according to the present invention is preferably 0 ppm to 100 ppm, more preferably 0 ppm to 80 ppm, and most preferably 0 ppm to 60 ppm. The "quantity of the remaining sulfuric acid" described herein is calculated as elemental sulfur and is expressed by a mass fraction of the quantity of elemental sulfur quantitatively determined by an atomic absorption spectrophotometry method to the total quantity of the cellulose acylate.

In order to set the quantity of the remaining sulfuric acid of the cellulose acylate to 0 ppm to 100 ppm, atomized cellulose acylate is cleaned in a hot bath. At this time, the particle diameter of the cellulose acylate is preferably 10 μm to 1 mm, more preferably 30 μmm to 500 μmm, and most preferably 50 μmm to 300 μmm (a flake shape having 3 mm or more, in a general method). When the surface area increases by miniaturization, it is possible to increase cleaning efficiency. In order to perform the miniaturization, the cellulose acylate is contained in a poor solvent to be synthesized and solidified. Carboxylic acid of carbon number 1 to 5 is mixed into solidified liquid by preferably 5 to 80% by mass, more preferably 10 to 70% by mass, and most preferably 15 to 60% by mass. Accordingly, it is possible to accomplish the miniaturization of the cellulose acylate compared with a case of using only water in a general method.

The obtained cellulose acylate is water-cleaned such that the quantity of the remaining sulfuric acid of the cellulose acylate becomes 0 ppm to 100 ppm. The temperature of cleaning water is preferably 50° C. to 100° C., more preferably 60° C. to 98° C., and most preferably 65° C. to 95° C. This is because the Tg of the cellulose acylate is reduced to 50 to 60° C. in water and thus the cleaning efficiently is remarkably improved. The number of cleaning processes is preferably 3 to 20, more preferably 4 to 15, and most preferably 5 to 10.

(D) Cellulose Acylate Including at Least One of Acetic Acid, Propionic Acid, Butyric Acid and Valeric Acid by 1 Ppm to 500 ppm When acetic acid, propionic acid, butyric acid and valeric acid are contained in the cellulose acylate to form a hydrogen bond with the residual hydroxyl group, it is possible to prevent a hydrogen bond from being formed between the cellulose acylates. The quantity of acid is preferably 1 ppm to 500 ppm, more preferably 5 ppm to 300 ppm, and most preferably 10 ppm to 200 ppm with respect to the cellulose acylate. After forming the film, this range is preferable.

One type or two types of acid may be used. Acid may be added at any timing. Acid may be, for example, added upon the pelletization of the cellulose acylate, and may be added when the film is molten and formed. The concentration of acid is preferably in the above-described range since the extruding process using the die, which is the final step of the melting process, is influenced by the concentration of acid. That is, since the cellulose acylate extruded from the die is solidified to a film, the concentration of acid in the film is in the above-described range. The quantity of acid contained in the film is quantitatively determined in the following condition using gas chromatography by melting the cellulose acylate in a good solvent (e.g. dichloromethane).

(E) Cellulose Acylate Including Alkali Metal Ions by 1 ppm to 200 ppm

Alkali metal ions are contained in the cellulose acylate by preferably 1 ppm to 200 ppm, more preferably 5 ppm to 150 ppm, and more preferably 10 ppm to 100 ppm. By containing the alkali metal ions in the cellulose acylate by 1 ppm to 200 ppm, the residual hydroxyl group in the cellulose acylate is masked such that the temperature and shear rate dependency of the melt viscosity due to the hydrogen bond between the hydroxyl groups can be reduced. The alkali metal ions may be contained in any form such as inorganic salts (e.g. sodium halide, sodium sulfate, or sodium nitrate) or organic salts (e.g. carboxylate salt such as sodium carbonate, sodium acetate, or sodium propionate).

Such effect specially appears in Na and does not appear in polyvalent metal ions such as Mg or Ca. This is because the polyvalent metal ions have a structure such as cross-linkage between the residual hydroxyl groups of the cellulose acylate and thus structural viscosity is easy to occur.

Although (A) To (E) may be independently performed, synergetic effect is obtained by the combination thereof.

<<Additives>>

In addition to the above-mentioned low molecular weight compound of the invention, following additives may be added.

(Plasticizer)

As the plasticizer, those described in JP-A-2000-352620 may be used, and its amount may be from 0.1 to 25% by mass relative to cellulose acylate, more preferably from 1 to 20% by mass, even more preferably from 3 to 15% by mass.

The plasticizer includes, for example, alkylphthalylalkyl glycolates, phosphates and carboxylates.

The alkylphthalylalkyl glycolates include, for example, methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate.

The phosphates include, for example, triphenyl phosphate, tricresyl phosphate, phenyl diphenyl phosphate. Further, the phosphate plasticizers described in JP-T-6-501040, claims 3-7 are also preferably used herein. As mentioned in the above, phosphates are effective for promoting crystallization of cellulose acylate to produce streaks, but combined with the low-molecular compound in the invention, such their effect may be prevented. Accordingly, the low-molecular compound in the invention may be combined with a phosphate.

The carboxylates include, for example, phthalates such as dimethyl phthalate, diethyl phthalate, dibutyl phthalate, dioctyl phthalate and diethylhexyl phthalate; citrates such as acetyltrimethyl citrate, acetyltriethyl citrate, acetyltributyl citrate; as well as adipates such as dimethyl adipate, dibutyl adipate, diisobutyl adipate, bis(2-ethylhexyl) adipate, diisodecyl adipate and bis(butyl diglycoladipate). In addition, also preferably, butyl oleate, methylacetyl ricinoleate, dibutyl sebacate and triacetin may be used either singly or as combined with the above.

The Polyalcohol plasticizers are also preferably used herein. The polyalcohol plasticizers include glycerin-type ester compounds such as glycerin esters, diglycerin esters; polyalkylene glycols such as polyethylene glycol, polypropylene glycol; and compounds of polyalkylene glycols with an acyl group bonding to the hydroxyl group thereof, which are well compatible with cellulose fatty acid esters and which remarkably exhibit their thermo-plasticization effect. Though not comparable to the above-mentioned "low-molecular compound, in the invention, these polyalcohol plasticizers are effective for preventing the melt from sticking to a screw and for enabling a smooth flow of the melt to prevent the generation of V-shaped streaks.

Concretely, the glycerin esters include glycerin diacetate stearate, glycerin diacetate palmitate, glycerin diacetate myristate, glycerin diacetate laurate, glycerin diacetate caprate, glycerin diacetate nonanoate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanoate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate myristate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, glycerin oleate propionate, to which, however, the invention should not be limited. One or more of these may be used herein either singly or as combined.

Of the above, preferred are glycerin diacetate caprylate, glycerin diacetate pelargonate, glycerin diacetate caprate, glycerin diacetate laurate, glycerin diacetate myristate, glycerin diacetate palmitate, glycerin diacetate stearate, glycerin diacetate oleate.

Examples of the diglycerin esters are mixed acid esters of diglycerin and others, for example, diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramyristate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate myristate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate dipentanoate, diglycerin diacetate dicaprylate, diglycerin diacetate dipelargonate, diglycerin diacetate dicaprate, diglycerin diacetate dilaurate, diglycerin diacetate dimyristate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimyristate, diglycerin acetate tripalmitate, diglycerin acetate tristearate, diglycerin acetate trioleate, diglycerin laurate, diglycerin stearate, diglycerin caprylate, diglycerin myristate, diglycerin oleate, to which, however, the invention should not be limited. One or more of these may be used herein either singly or as combined.

Of the above, preferred are diglycerin tetraacetate, diglycerin tetrapropionate, diglycerin tetrabutyrate, diglycerin tetracaprylate, diglycerin tetralaurate.

Examples of the polyalkylene glycols are polyethylene glycol and polypropylene glycol having a mean molecular weight of from 200 to 1000, to which, however, the invention should not be limited. One or more of these may be used herein either singly or as combined.

Examples of the compounds of polyalkylene glycols with an acyl group bonding to the hydroxyl group thereof are polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanoate, polyoxyethylene caprate, polyoxyethylene laurate, polyoxyethylene myristate, polyoxyethylene palmitate, polyoxyethylene stearate, polyoxyethylene oleate, polyoxyethylene linolate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanoate, polyoxypropylene caprate, polyoxypropylene laurate, polyoxypropylene myristate, polyoxypropylene palmitate, polyoxypropylene stearate, polyoxypropylene oleate, polyoxypropylene linolate, to which, however, the invention should not be limited. One or more of these may be used herein either singly or as combined.

The use amount of the plasticizers in a cellulose acylate film is preferably in the range of 0 to 20% by mass, more preferably in the range of 1 to 20% by mass, and even more preferably 2 to 15% by mass. If necessary, the plasticizers may be used in combination of two kinds or more as needed.

(Matting Agent)

Fine particles are preferably added to the cellulose acylate of the invention as a matting agent. Examples of fine particles used in the invention can include silicon dioxide, titanium dioxide, oxidized aluminum, oxidized zirconium, calcium carbonate, talc, clay, calcined kaolin, calcined calcium silicate, calcium silicate hydrate, aluminium silicate, magnesium silicate, and calcium phosphate. Fine particles preferably include silicon and more preferably include silicon dioxide in that turbidity is reduced. It is preferable that fine particles of silicon dioxide have an average primary particle size of 20 nm or less, and an apparent specific gravity of 70 g/L or more. It is more preferable that the average diameter of primary particles is as small as in the range of 5 to 16 nm because a haze of a film can be reduced. The apparent specific gravity is preferably in the range of 90 to 200 g/L or more, and more preferably in the range of 100 to 200 g/L or more. A greater apparent specific gravity is preferable from the viewpoint of preparing a high concentration dispersion and making an improvement in a haze and aggregates.

In general, the fine particles form secondary fine particles having an average particle size in the range of 0.1 to 3.0 μm. In a film, the secondary fine particles exist as aggregates of the first particles, and form an irregularity of from 0.1 to 3.0 μm on a film surface. An average secondary particle size is preferably in the range of 0.2 to 1.5 μm, more preferably in the range of 0.4 to 1.2 μm, and even more preferably in the range of 0.6 to 1.1 μm. Particles in a film are observed with a scanning electron microscope and diameters of circles externally contacting the particles are set as the primary and secondary particle sizes. In a different place, 200 particles are observed and the average value thereof is set as the average particle size.

As fine particles of silicon dioxide, a commercialized product exemplified by AEROSIL R972, R972V, R974, R812, 200, 200V, 300, R202, OX50, TT600 (produced by NIPPON AEROSIL CO., LTD) or the like can be used. For fine particles of oxidized zirconium, products such as AEROSIL R976 and R811 (produced by NIPPON AEROSIL CO., LTD.) are available in the market, and can be used.

Among them, AEROSIL 200V and AEROSIL R972V are fine particles of silicon dioxide having an average primary particle size of 20 nm or less, and an apparent specific gravity of 70 g/L or more. AEROSIL 200V and AEROSIL R972V are particularly preferable to maintain low turbidity and reduce a friction coefficient of an optical film.

(Other Additive Agent)

In addition, various additive agents, for example, an ultraviolet ray protective agent (e.g. a hydroxybenzophenone-based compound, a benzotriazole-based compound, a salicylate ester-based compound, a cyanoacrylate-based compound, or the like), a deterioration-preventive agent (e.g. an antioxidizing agent, a peroxide decomposer, a radical inhibitor, a metal deactivator, an acid capturer, amine, or the like), an infrared absorbent, an optical adjuster, an interfacial active agent, and an odor trap agent, may be added. The detailed contents are disclosed in 17-22 pages of the open technical report of Japan Institute of Invention and Innovation (Open technique No. 2001-1745, issued on Mar. 15, 2001, Japan Institute of Invention and Innovation).

Among them, as the infrared absorbent (infrared absorption dye), the infrared absorbent disclosed in Japanese Unexamined Patent Publication No. 2001-194522 can be used and, as the ultraviolet ray protective agent (ultraviolet ray absorbent), the ultraviolet ray protective agent disclosed in Japanese Unexamined Patent Publication No. 2001-151901 can be used, each of which is preferably contained in the cellulose acylate by 0.001 to 5% by mass.

For stabilizers for thermal degradation inhibition or discoloration inhibition, herein usable are epoxy compounds, weak organic acids, phosphates, thiophosphate compounds, phosphites (e.g., as in JP-A-51-70316, 10-306175, 57-78431, 54-157159, 55-13765), phosphite compounds (as in JP-A-2004-182979). One or more of these may be used herein either singly or as combined. Each of which is preferably contained in the cellulose acylate by 0.001 to 5% by mass.

As the optical adjuster, there is a retardation adjuster which is for example, disclosed in Japanese Unexamined Patent Publication No. 2001-166144, Japanese Unexamined Patent Publication No. 2003-344655, Japanese Unexamined Patent Publication No. 2003-248117, or Japanese Unexamined Patent Publication No. 2003-66230. Accordingly, an in-plane retardation (Re) and a retardation in the thickness direction (Rth) can be controlled. The addition quantity of the optical adjuster is preferably 0 to 10% by mass, more preferably 0 to 8% by mass, and most preferably 0 to 6% by mass.

<<Pelletization>>

The cellulose acylate and the additive agents are preferably pelletized before the melt-casting film formation. The pelletization may be performed by adjusting the percentages of water content of the cellulose acylate and the additive agents to 0.5% by mass or less, melting the cellulose acylate and the additive agents at preferably 150° C. to 250° C., more preferably 160° C. to 230° C., and most preferably 170° C. to 220° C., extruding the cellulose acylate and the additive agents in a noodle shape using a biaxial kneading extruder, and solidifying and cutting the cellulose acylate and the additive agents in water. In the preferable size of the pellet, it is preferable that a section area is 1 mm$^2$ to 300 mm$^2$ and a length is 1 mm to 30 mm. In the present invention, it is preferable that the cellulose acylate and the additive agents are directly mixed. The method disclosed in Japanese Unexamined Patent Publication No. 2000-352620 (the cellulose acylate and the additive agents are molten and mixed in a solvent and are dried) is not preferable. This is because the remaining solvent exists even after dry and becomes bubble in the process of the melt-casting film formation.

<<Melt-Casting>>

(1) Drying

When the cellulose acylate film according to the invention is produced, it is preferable to use the cellulose acylate film palletized by the above-described method. Before the melt-casting film formation, the pellets is added into the hopper of a melt extruder after the water content of pellets is adjusted to be 1% or less, and more preferably 0.5% or less. At this time, a temperature of the hopper is set to preferably from 20 to 110° C., more preferably 40 to 100° C., and even more preferably from 50 to 90° C. In this step, it is preferable to fill the hopper with an inert gas such as nitrogen.

(2) Melt Extruding

The barrel temperature of the melt extruder is preferably 170° C. to 250° C., more preferably 180° C. to 240° C., and most preferably 190° C. to 230° C. The barrel temperature may be uniform or the barrel may be divided into a plurality of regions and the temperatures of the regions may be independently controlled. In this case, it is preferable that the temperature gradually rises from the inlet to the outlet.

The screw may have a single flight or a double flight, and a compression ratio is preferably 1.2 to 5, more preferably 1.5 to 4, and most preferably 2 to 3.5. L/D (a ratio of the length L to the diameter D of the screw) is preferably 10 to 100, more preferably 15 to 70, and most preferably 20 to 50. The diameter of the screw is preferably 10 mm to 300 mm, more preferably 20 mm to 200 mm, and most preferably 30 mm to 100 mm.

The holding time of the cellulose acylate resin in the barrel is preferably 2 min to 30 min, more preferably 3 min to 20 min, and most preferably 4 min to 15 min.

It is more preferable that the extrusion is performed in inert (nitrogen or the like) airstream in the melt extruder or using an extruder attached with a vent while performing evacuation. In this case, it is possible to suppress the decomposition of the cellulose acylate.

(3) Casting

After the melted resin is passed through a gear pump, the melted resin is filtered through a filter or the like and extruded from a die attached behind the filter (resin outlet side) into the shape of a sheet on a cooling drum. AS a die, a T-die and a coat hanger die are preferably for use, more preferably a T-die is for use. A single layer may be extruded, or multiple layers may be extruded by using a multi-manifold die or feed block die. In this operation, the thickness unevenness may be ameliorated by adjusting a gap between lips of the die.

Then, the resin is extruded on a casting drum. In this operation, it is preferable to use the static electricity applying method, air knife method, air chamber method, vacuum nozzle method, touch roll method or the like to enhance adhesion between the casting drum and the melt-extruded sheet. Such a method for enhancing adhesion may be performed for the total area of the melt-extruded sheet or a part of the sheet.

In the present invention, a touch roll method is more preferably used upon casting. In this method, the melt discharged from the die is inserted between a casting drum and a touch roll to be solidified. For example, as shown in FIG. 1, the cellulose acylate molten material (melt) 3 is supplied from an extruder 1 to a first casting roll 11 via a die 2, is brought in contact with a touch roll 4, and is guided to a second casting roll 12 and a third casting roll 13. As a result, the ununiformity of the cellulose acylate (the both surfaces thereof have low alignment and soft structure and the center thereof has high alignment and a hard structure) when being extruded from the die can be solved. That is, the both soft surfaces are pressed and solidified by the touch roll to have the same high alignment and hard structure as the center.

However, if the touch roll is too rigid, a residual distortion is apt to occur when the melt discharged from the die is inserted between the rolls. Accordingly, the material of the touch roll is preferably elastic. An excessive surface pressure may be absorbed by deforming the touch roll. In order to apply the elasticity to the roll, the thickness of the outer tube of the roll is smaller than that of a general roll and the thickness z of the outer tube is preferably 0.05 to 7.0 mm, more preferably 0.2 mm to 5.0 mm, and most preferably 0.3 mm to 2.0 mm. For example, the elasticity may be applied by decreasing the thickness of the outer tube or the formation of the film using the touch roll is performed by a very thin outer tube obtained by providing an elastic layer on a metal shaft, mounting an outer tube thereon, filling a liquid medium layer between the elastic layer and the outer tube. The surface of the casting roll or the touch roll is preferably a mirror surface, the arithmetic average height Ra is preferably 100 nm or less, more preferably 50 nm or less, and most preferably 25 nm or less. In detail, for example, that disclosed in Japanese Unexamined Patent Publication No. 11-314263, Japanese Unexamined Patent Publication No. 2002-36332, Japanese Unexamined Patent Publication No. 11-235747, Japanese Unexamined Patent Publication No. 2004-216717, Japanese Unexamined Patent Publication No. 2003-145609, or WO97/28950 may be used.

Since fluid is filled in the inside of the thin outer tube, the touch roll is elastically deformed in a concave shape by the pressure when the touch roll is brought in contact with the casting roll. Accordingly, in order that the touch roll and the casting roll are in surface contact with each other, the pressure is distributed to obtain a low surface pressure. Accordingly, it is possible to correct the fine irregularities of the surface of the film inserted therebetween without the residual distortion. The linear pressure of the touch roll is preferably 3 kg/cm to 100 kg/cm, more preferably 5 kg/cm to 80 kg/cm, and most preferably 7 kg/cm to 60 kg/cm. The linear pressure described herein is a value obtained by dividing the force applied to the touch roll by the width of the discharge port of the die. If the linear pressure is 3 kg/cm or more, the irregularities between the inner side and the surface are corrected by pressing the touch roll and thus the improvement effect of the cutting wastage reduction is easily obtained. If the linear pressure is 100 kg/cm or less, weakening due to high alignment is prevented and thus the cutting wastage is easily suppressed.

The touch roll is set at a temperature of preferably 60 to 160° C., more preferably 70 to 150° C., and further preferably 80 to 140° C. The temperature control can be achieved by passing liquid or gas adjusted to the temperature inside the rolls.

It is more preferable that the annealing is performed using a number of casting drums (roll) (among these, the one employing the touch roll is placed to be touched to a first casting roll of the highest upstream (near to the die)).

The surface of the casting drum is preferably at a temperature of 60 to 160° C., more preferably 70 to 150° C., still more preferably 80 to 140° C. After the casting, the cellulose acylate sheet-like (unstretched cellulose acylate film) is peeled off from the casting drum, passed through a gap between nip rollers and rolled up. The rolling up speed is preferably 10 to 100 m/minute, more preferably 15 to 80 m/minute, still more preferably 20 to 70 m/minute. The thickness of the unstreched film may be controlled by the rolling up speed. The unstretched film obtained as described above preferably has a thickness of 30 to 300 μm, more preferably 40 to 250 μm, still more preferably 50 to 200 μm. The width of the formed film is preferably 0.7 to 5 m, more preferably 1 to 4 m, still more preferably 1.3 to 3 m.

The film obtained as described above is preferably trimmed for the both side ends and then rolled up. The trimmed portions may be reused as a raw material of films of the same type or different type after grinding or processing such as granulation, depolymerization and re-polymerization as required.

Before the take-up, a lamination film is preferably applied to at least one surface for preventing scars. The thickness of lamination film is 1 to 100 μm, more preferably 10 to 70 μm.

Before the take-up, a process of providing thickness on both sides (knurling treatment) can be preferably performed. The width for thickening process is preferably 1 to 50 mm, more preferably 2 to 30 mm. The height of rough protrusion due to the thickening process is preferably 10 to 100 μm, more preferably 20 to 80 μm. The portion from the both end is preferably 0 to 50 mm, more preferably 0 to 30 mm.

The take up tension is preferably 1 kg/m in width to 50 kg/m in width, more preferably 2 kg/m in width to 40 kg/m in width, and further preferably 3 kg/m in width to 20 kg/m in width. When the take-up tension is 1 kg/m or more in width, uniform take up of the film tends to be easy. On the other hand, when the take-up tension is 50 kg/m or less in width, the tight winding of the film or giving a poor appearance of the wound film tend to improve, and also problems such as raised portions in the film is extended due to creep, resulting in waving of the film, and residual birefringence is produced due to extension of the film, are more likely to improve. The take-up tension is detected by tension control along the line, and the film is preferably taken up being controlled to a constant take-up tension. When the film temperature varies depending on the position in the film forming line, films may have a slightly different length due to thermal expansion. Accordingly, it is necessary that the drawing ratio of nip rollers is adjusted so that a tension higher than a pre-determined tension is not applied to the film in the line.

The film can be taken up at a constant tension by the control in the tension control. More preferably, however, the tension is tapered proportional to the roll diameter to determine an appropriate take-up tension. Generally, the tension is gradually reduced as the roll diameter increases, but in some cases, the tension is preferably increased as the roll diameter increases.

(4) Property of Undrawn Cellulose Acylate Film

The obtained undrawn cellulose acylate film has preferably Re=0 to 20 nm and Rth=0 to 80 nm, more preferably Re=0 to 15 nm and Rth=0 to 70 nm, most preferably Re=0 to 10 nm and Rth=0 to 60 nm.

In the present specification, Re and Rth denote the in-plane retardation and the retardation in the thickness direction at a wavelength of 590 nm, respectively. The Re is measured by inputting light having a wavelength of 590 nm in the normal direction of the film in KOBRA 21ADH or WR (made by Oji Scientific Instruments).

When the measured film is represented by a uniaxial or biaxial index ellipsoid, the Rth is calculated by the following method.

When light having a wavelength of 590 nm from an inclined direction from −50° to +50° by 10° in the normal direction of the film as an in-plane delay phase axis (determined by KOBRA 21ADH or WR) as a tilt angle (rotation angle) (any direction in the plane of the film becomes the tilt axis if there is no a delay phase axis) is input and the Re is measured at 11 points, the Rth is calculated by KOBRA 21ADH or WR based on the measured retardation value, an average refractive index and a film thickness.

In a film having a direction in which the retardation value is zero at any angle using the in-plane delay phase axis as the tilt axis from the normal direction, the retardation value at a tilt angle larger than the tilt angle is calculated by KOBRA 21ADH or WR after the sign thereof is changed to a negative sign.

The Rth may be calculated from Formula (b) and Formula (c) based on the average refractive index, the film thickness, and the retardation value measured from two inclined directions using the delay phase axis as the tilt angle (rotation angle) (any direction in the plane of the film becomes the tilt axis if there is no a delay phase axis).

[Number 1]

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Formula (b)

In Formula, Re (θ) denotes the retardation value in the direction inclined by an angle θ from the normal direction, nx denotes the refractive index of the delay phase axis of the plane, ny denotes the refractive index in the direction orthogonal to nx in the plane, and nz denotes the refractive index in the direction orthogonal to nx and ny.

$$Rth = ((nx+ny)/2 - nz) \times d$$

Formula (c)

If the measured film is not represented by the uniaxial or biaxial index ellipsoid, that is, if the measured film is a film without an optic axis, Rth is calculated by the following method.

When light having a wavelength of 590 nm from an inclined direction from −50° to +50° by 10° in the normal direction of the film as an in-plane delay phase axis (determined by KOBRA 21ADH or WR) as a tilt angle (rotation angle) is input and the Re is measured at 11 points, the Rth is calculated by KOBRA 21ADH or WR based on the measured retardation value, an average refractive index and a film thickness.

By inputting the average refractive index and the film thickness, KOBRA 21ADH or WR calculates nx, ny and nz. From the calculated nx, ny and nz, Nz=(nx−nz)/(nx−ny) is calculated.

Preferably, the whole light transmittance of the unstreched cellulose acylate film is from 90% to 100%, more preferably from 91% to 99%, even more preferably from 92% to 98%. The haze of the film is preferably from 0% to 1%, more preferably from 0% to 0.8%, even more preferably from 0% to 0.6%.

The thickness unevenness is preferably in the range of 0 to 4% both in the length direction and in the width direction, more preferably in the range of 0 to 3%, and even more preferably 0 to 2%.

The unstretched cellulose acylate film preferably has preferably the tensile modulus of the film is from 1.5 kN/mm² to 3.5 kN/mm², more preferably from 1.7 kN/mm² to 2.8 kN/mm², further more preferably from 1.8 kN/mm² to 2.6 kN/mm².

The elongation at break of the film is from 3% to 100%, preferably more preferably from 5% to 80%, further more preferably from 8% to 50%.

Tg of the film (Tg of the mixed compound of cellulose acylate and the additives) is preferably from 95° C. to 145° C., more preferably from 100° C. to 140° C., further more preferably from 105° C. to 135° C.

The thermal dimensional change of the film at 80° C. for 1 day is preferably from 0% to +1%, more preferably from 0% to ±0.5%, even more preferably from 0% to ±0.3%.

The moisture permeability of the film at 40° C. and 90% RH is preferably from 300 g/m²·day to 1000 g/m²·day, more preferably from 400 g/m²·day to 900 g/m²·day, even more preferably from 500 g/m²·day to 800 g/m²·day.

The equivalent water content of the film at 25° C. and 80% RH is preferably from 1% by mass to 4% by mass, more preferably from 1.2% by mass to 3% by mass even more preferably from 1.5% by mass to 2.5% by mass.

<<Drawing>>

Although the undrawn cellulose acylate film formed by the above-described method may be used as the cellulose acylate film according to the present invention without change, but the undrawn cellulose acylate film may be drawn. By drawing the film, the Re and Rth of the film can be controlled.

The drawing is performed at preferably Tg to Tg+50, more preferably Tg+3° C. to Tg+30° C., and most preferably Tg+5° C. to Tg+20° C. The draw ratio of at least one side is preferably 1% to 300%, more preferably 2% to 250%, and most preferably 3% to 200%. Although the film may be uniformly drawn in the vertical and horizontal directions, the draw ratios of the vertical and horizontal directions are preferably different from each other. Any one of the vertical magnification ratio (MD) and the horizontal magnification ratio (TD) is larger. A smaller draw ratio is preferably 1% to 30%, more preferably 2% to 25%, and more preferably 3% to 20%. A larger draw ratio is preferably 30% to 300%, more preferably 35% to 200%, and more preferably 40% to 200%. The drawing may be performed by one step or multiple steps. The draw ratio is obtained using the following formula.

Draw ratio (%)=100×{length after drawing}−(length before drawing)}/(length before drawing)

The stretching may be made in the machine direction (machine-direction stretching), using at least two pairs of nip rolls of which the peripheral speed on the take-out side is kept higher; or may be made in the cross direction (the direction perpendicular to the machine direction) (cross-direction stretching), with both edges of the film held zipped. A simultaneous biaxial stretching method as in JP-A-2000-37772, 2001-113591, 2002-103445 may also be employed herein.

For freely controlling the ratio of Rth/Re in machine-direction stretching, it may be attained by controlling the value obtained by dividing the nip roll distance by the film width (aspect ratio). Specifically, when the aspect ratio is made small, then the ratio Rth/Re may be made large. Further, combining the machine-direction stretching and the cross-direction stretching makes it possible to control Re and Rth. Namely, reducing the difference between the machine-direction draw ratio and the cross-direction draw ratio makes Re smaller and increasing it makes Rth larger.

Preferably, Re and Rth of the stretched cellulose acylate film satisfy the following formulae (1a) to (1c):

$Re \leq Rth$, $0 \leq Re \leq 200$, $30 \leq Rth \leq 500$.

More preferably, Re and Rth satisfy the following formulae $Re \times 1.1 \leq Rth$, $10 \leq Re \leq 150$, $50 \leq Rth \leq 400$.

Even more preferably, Re and Rth satisfy the following formulae $Re \times 1.2 \leq Rth$, $20 \leq Re \leq 100$, $80 \leq Rth \leq 350$.

Preferably, the angle θ formed by the film-traveling direction (machine direction) and the slow axis of Re of the film is nearer to 0°, +90° or −90°. Concretely, in machine-direction stretching, the angle is preferably nearer to 0°, more preferably to 0±3°, even more preferably to 0±2°, still more preferably to 0±1°. In cross-direction stretching, the angle is preferably 90±3° or −90±3°, more preferably 90±20 or −90±2°, even more preferably 90±1° or −90±1°.

The thickness of the stretched cellulose acylate film is preferably from 15 μm to 200 μm, more preferably from 30 μm to 170 μm, even more preferably from 40 μm to 140 μm. Both stretched and unstretched, the thickness unevenness of the film is preferably from 0% to 2%, more preferably from 0% to 1.5%, even more preferably from 0% to 1% both in the machine direction and in the cross direction thereof.

Thus obtained, the stretched cellulose acylate film preferably has preferably the tensile modulus of the film is from 1.5 kN/mm² to 3.5 kN/mm², more preferably from 1.7 kN/mm² to 2.8 kN/mm², further more preferably from 1.8 kN/mm² to 2.6 kN/mm².

The elongation at break of the film is, more preferably from 5% to 80%, further more preferably from 8% to 50%.

Tg of the film (Tg of the mixed compound of cellulose acylate and the additives) is preferably from 95° C. to 145° C., more preferably from 100° C. to 140° C., further more preferably from 105° C. to 135° C.

The thermal dimensional change of the film at 80° C. for 1 day is preferably from 0% to ±1%, more preferably from 0% to ±0.5%, even more preferably from 0% to ±0.3%.

The moisture permeability of the film at 40° C. and 90% RH is preferably from 300 g/m²·day to 1000 g/m²·day, more preferably from 400 g/m²·day to 900 g/m²·day, even more preferably from 500 g/m²·day to 800 g/m²·day.

The equivalent water content of the film at 25° C. and 80% RH is preferably from 1% by mass to 4% by mass, more preferably from 1.2% by mass to 3% by mass even more preferably from 1.5% by mass to 2.5% by mass.

The thickness of the film is preferably from 30 μm to 200 μm, more preferably from 40 μm to 180 μm, even more preferably from 50 μm to 150 μm.

The haze of the film is preferably from 0% to 3%, more preferably from 0% to 2%, even more preferably from 0% to 1%. Preferably, the whole light transmittance of the film is from 90% to 100%, more preferably from 91% to 99%, even more preferably from 92% to 98%.

(Surface Treatment)

The cellulose acylate film may be optionally subjected to surface treatment to thereby improve the adhesiveness between the cellulose acylate film and various functional layers (e.g., undercoat layer, back layer) adjacent thereto. The surface treatment is, for example, glow discharge treatment, UV irradiation treatment, corona treatment, flame treatment, or acid or alkali treatment. The glow discharge treatment as referred to herein is the treatment which the plasma treatment is performed under an atmosphere of a plasma-exciting vapor.

The glow discharge treatment includes low-temperature plasma treatment to be effected under a low gas pressure of from $10^{-3}$ to 20 Torr. And the plasma treatment under atmospheric pressure is also preferable one. The plasma-exciting vapor to be used in the plasma treatment is a vapor that is excited by plasma under the condition as above. The plasma-exciting vapor includes, for example, argon, helium, neon, krypton, xenon, nitrogen, carbon dioxide, flons such as tetrafluoromethane, and their mixtures. Their details are described in Hatsumei Kyokai Disclosure Bulletin (No. 2001-1745, published by the Hatsumei Kyokai on Mar. 15, 2001), pp. 30-32. For the plasma treatment under atmospheric pressure that has become specifically noted recently, preferably used is irradiation energy of from 20 to 500 KGy under 10 to 1000 Kev, more preferably from 20 to 300 KGy under 30 to 500 Kev. Of the above-mentioned treatments, more preferred is alkali saponification, and this is extremely effective for the surface treatment of cellulose acylate films. Concretely, treatments described in JP-A-2003-3266, JP-A-2003-229299, JP-A-2004-322928, and JP-A-2005-76088 are for use.

For the alkali saponification, the film to be processed may be dipped in a saponification solution or may be coated with it. In the dipping method, the film may be led to pass through a tank of an aqueous NaOH or KOH solution having a pH of from 10 to 14 at 20 to 80° C., taking 0.1 minutes to 10 minutes, and then neutralized, washed with water and dried.

When the alkali saponification is attained according to a coating method, employable for it are a dip-coating method, a curtain-coating method, an extrusion-coating method, a bar-coating method and an E-type coating method. The solvent for the alkali saponification coating solution is preferably so selected that the saponification solution comprising it may well wet a transparent support to which the solution is applied, and that the solvent does not roughen the surface of the transparent support and may keep the support having a good surface condition. Concretely, alcohol solvents are preferred, and isopropyl alcohol is more preferred. An aqueous solution of surfactant may also be used as the solvent. The alkali to be in the alkali saponification coating solution is preferably an alkali soluble in the above-mentioned solvent. More preferably, it is KOH or NaOH. The pH of the saponification coating solution is preferably at least 10, more preferably at least 12. Regarding the reaction condition in alkali saponification, the reaction time is preferably from 1 second to 5 minutes at room temperature, more preferably from 5 seconds to 5 minutes, even more preferably from 20 seconds to 3 minutes. After the alkali saponification treatment, it is desirable that the saponification solution-coated surface of the film is washed with water or with an acid and then further washed with water. If desired, the coating saponification treatment may be effected continuously with the alignment film removal treatment that will be mentioned hereinunder. In that manner, the number of the processing steps in producing the film may be decreased. Concretely, for example, the saponification method is described in JP-A-2002-82226 and WO02/46809.

Preferably, the cellulose acylate film of the invention is provided with an undercoat layer for improving the adhesiveness thereof to the functional layers to be formed thereon. The undercoat layer may be formed on the film after the above-mentioned surface treatment, or may be directly formed thereon with no surface treatment. The details of the undercoat layer are described in Hatsumei Kyokai Disclosure Bulletin (No. 2001-1745, published on Mar. 15, 2001 by the Hatsumei Kyokai), p. 32.

The step of surface treatment and undercoat layer formation may be carried out singly or as combined with the last step in the process of film formation. Further, the step may also be carried out along with the step of forming the functional groups to be mentioned hereinunder.

<<Application of Functional Layer>>

Preferably, the stretched and unstretched cellulose acylate film of the invention is combined with functional layers described in detail in Hatsumei Kyokai Disclosure Bulletin (No. 2001-1745, published on Mar. 15, 2001 by the Hatsumei Kyokai), pp. 32-45. Above all, it is desirable that the film is provided with a polarizing layer (for polarizer), an optically-compensatory layer (for optical compensatory sheet), an anti-reflection layer (for antireflection film) and hard-coat layer.

(1) Formation of Polarizing Layer (Construction of Polarizer)

[Materials Used for Polarizing Film]

At present, one general method for producing commercially-available polarizing films comprises dipping a stretched polymer in a solution containing iodine or dichroic dye in a bath to thereby infiltrate iodine or dichroic dye into the binder. As the polarizing film, a coated polarizing film such as typically that by Optiva Inc. may be utilized. Iodine and dichroic dye in the polarizing film are aligned in the binder and express the polarization property. The dichroic dye includes azo dyes, stilbene dyes, pyrazolone dyes, triphenylmethane dyes, quinoline dyes, oxazine dyes, thiazine dyes and anthraquinone dyes. Preferably, the dichroic dye is soluble in water. Also preferably, the dichroic dye has a hydrophilic substituent (e.g., sulfo, amino, hydroxyl). For example, the compounds described in Hatsumei Kyokai Disclosure Bulletin (No. 2001-1745, published on Mar. 15, 2001 by the Hatsumei Kyokai), p. 58 may be used as the dichroic dye herein.

For the binder for the polarizing film, usable are a polymer that is crosslinkable by itself, and a polymer that is crosslinkable with a crosslinking agent. These polymers may be combined for use herein. The binder includes, for example, methacrylate copolymers, styrene copolymers, polyolefins, polyvinyl alcohols, modified polyvinyl alcohols, poly(N-methylolacrylamides), polyesters, polyimides, vinyl acetate copolymers, carboxymethyl cellulose and polycarbonates, as in JP-A-8-338913, [0022]. In addition, a silane coupling agent may also be used as the polymer. Above all, water-soluble polymers (e.g., poly(N-methylolacrylamide), carboxymethyl cellulose, gelatin, polyvinyl alcohol, modified polyvinyl alcohol) are preferred; gelatin, polyvinyl alcohol and modified polyvinyl alcohol are more preferred; and polyvinyl alcohol and modified polyvinyl alcohol are most preferred. Especially preferably, two different types of polyvinyl alcohols or modified polyvinyl alcohols having a different degree of polymerization are combined for use herein. Preferably, the degree of saponification of polyvinyl alcohol for use herein is from 70 to 100%, more preferably from 80 to 100%. Also preferably, the degree of polymerization of polyvinyl alcohol is from 100 to 5000. Modified polyvinyl alcohols are described in JP-A-8-338913, JP-A-9-152509 and JP-A-9-316127. Two or more different types of polyvinyl alcohols and modified polyvinyl alcohols may be combined for use herein.

Preferably, the lowermost limit of the thickness of the binder is 10 μm. Regarding the uppermost limit of the thickness thereof, it is preferably thinner from the viewpoint of the light leakage resistance of liquid-crystal display devices comprising it. Concretely, for example, it is desirable that the thickness of the polarizing film is not larger than the same level as that of currently commercially-available polarizers (about 30 μm), more preferably it is at most 25 μm, even more preferably at most 20 μm.

The binder of the polarizing film may be crosslinked. A polymer or a monomer having a crosslinking functional group may be incorporated into the binder, or the binder polymer may be so designed that it has a crosslinking functional group by itself. The crosslinking may be attained through exposure to light or heat or through pH change, and it gives a binder having a crosslinked structure therein. The crosslinking agent is described in U.S. Reissue Pat. No. 23,297. A boron compound (e.g., boric acid, borax) may also be used as a crosslinking agent. The amount of the crosslinking agent to be added to the binder is preferably from 0.1 to 20% by mass of the binder. Within the range, the alignment of the polarizer element and the wet heat resistance of the polarizing film are both good.

After the crosslinking reaction, it is desirable that the amount of the unreacted crosslinking agent still remaining in the polarizing film is at most 1.0% by mass, more preferably at most 0.5% by mass. Within the range, the polarizing film may have good weather resistance.

[Stretching of Polarizing Film]

Preferably, the polarizing film is stretched (according to a stretching process) or rubbed (according to a rubbing process), and then dyed with an iodine or dichroic dye.

In the stretching process, the draw ratio is preferably in the range of 2.5 to 30.0 times, more preferably in the range of 3.0 to 10.0 times. The stretching may be attained in dry in air. Contrary to this, the stretching may also be attained in wet while the film is dipped in water. Preferably, the draw ratio in dry stretching is in the range of 2.5 to 5.0 times, and the draw ratio in wet stretching is in the range of 3.0 to 10.0 times. The stretching may be performed in a direction parallel to a MD direction (according to a parallel stretching), or in an oblique direction (according to an oblique stretching). The stretching may be effected once, or a few times. When the stretching is effected a few times, then the film may be more uniformly stretched even at a high draw ratio. It is more preferable that the film is stretched in an oblique direction by 10 to 80 degrees.

(I) Parallel Stretching Method

Before stretched, PVA film is swollen. The degree of swelling of the film is from 1.2 to 2.0 times (in terms of the ratio by weight of the swollen film to the unswollen film). Next, the film is continuously conveyed via guide rolls, and led into a bath of an aqueous medium or into a dyeing bath of a dichroic substance solution. In the bath, in general, the film is stretched at a bath temperature of from 15 to 50° C., preferably from 17 to 40° C. The stretching may be effected by holding the film with two pairs of nip rolls, and the conveying speed of the latter-stage nip rolls is kept higher than that of the former-stage nip rolls. In view of the above-mentioned effects and advantages, the draw ratio in stretching, ratio of length of stretched film/length of initial film (the same shall apply hereinunder) is preferably from 1.2 to 3.5 times, more preferably from 1.5 to 3.0 times. Next, the stretched film is dried at 50 to 90° C. to be a polarizing film.

(II) Oblique Stretching Method:

For this, herein employable is a stretching method that uses a tenter stretched in the oblique direction, as in JP-A-2002-86554. According to this, the film is stretched in air, and therefore it must be wetted so as to be readily stretched. Preferably, the water content of the film is from 5% to 100%, the stretching temperature is preferably from 40° C. to 90° C. and the relative humidity is preferably from 50% to 100%.

Thus obtained, the absorption axis of the polarizing film is preferably from 10 degrees to 80 degrees, more preferably from 30 degrees to 60 degrees, even more preferably substantially 45 degrees (40 degrees to 50 degrees).

[Bonding]

The saponified cellulose acylate film is bonded to a polarizing film prepared by stretching to thereby produce a polarizer. The direction in which the saponified cellulose acylate film adheres to the polarizing film is not particularly limited, but preferably so controlled that the casting axis direction of the cellulose acylate film crosses the stretching axis direction of the polarizer at any one angle of an 0, 45, 90 degrees.

An adhesive to be used for bonding the treated cellulose acylate film surfaces to the polarizing plate is not particularly limited but is exemplified by a polyvinyl alcohol-containing adhesive such as PVA latex (including modified PVA such as an acetoacetyl group, a sulfonate group, a carboxyl group and an oxyalkylene group), or a boron compound aqueous solution. Preferably, a PVA-containing adhesive is used. After a drying treatment, the thickness of an adhesive layer is preferably in the range of 0.01 to 10 μm, and more preferably in the range of 0.05 to 5 μm.

Preferable bonding layer structures are as follows:

A) A/P/A;
B) A/P/B;
C) A/P/T;
D) B/P/B; and
E) B/P/T.

A is the unstretched film according to the invention, B is the stretched film according to the invention, T is the cellulose triacetate film (particularly, TAC film produced by FUJIFILM Corporation: FUJITAC TD 80U), and P is the polarizing film.

In case of structures A) and B), A and B may be cellulose acetate having the same composition, or cellulose acetate having a different composition. In case of structure A), A may be cellulose acetate having the same composition, or cellulose acetate having a different composition, and may be cellulose acetate having the same draw ratio, or cellulose acetate having a different draw ratio. In case of structure D), B may be cellulose acetate having the same composition, or cellulose acetate having a different composition, and may be cellulose acetate having the same draw ratio, or cellulose acetate having a different draw ratio. When the structures are mounted on a liquid crystal display device to be used, any side of the mounted structure may be a liquid crystal surface. In case of structures B) and E), B becomes preferably a liquid crystal side.

In general, a substrate including a liquid crystal is disposed between two sheets of polarizing plates when mounted on a liquid crystal display device. It is possible to combine structures A) to E) according to the invention and the general polarizing plate (T/P/T} structure in any manner. However, a transparent hard coat layer, an antiglare film, and an antireflection film are preferably applied to the front film of the display side of the liquid crystal display device, and the following may be used for each layer.

The light transmittance of the thus-obtained polarizer is preferably higher, and the degree of polarization thereof is also preferably higher. Concretely, the transmittance of the polarizer preferably falls between 30 and 50% for the light having a wavelength of 550 nm, more preferably between 35 and 50%, most preferably between 40 and 50%. The degree of polarization of the polarizer preferably falls between 90 and 100% for the light having a wavelength of 550 nm, more preferably between 95 and 100%, most preferably between 99 and 100%.

Circular polarized light may be obtained by laminating a γ/4 plate on the obtained polarizing plate according to the present invention. In this case, the γ/4 plate is laminated such that the angle between the delay phase axis of the γ/4 plate and the absorption axis of the polarizing plate becomes 45°. At this time, γ/4 is not specially limited, but the wavelength dependency that the retardation decreases as the wavelength decreases is more preferable. The γ/4 plate including a polarizing plate having an absorption axis inclined with respect to the longitudinal direction by 20° to 70° and an optical anisotropy layer composed of a liquid crystal compound is preferably used.

A protect film may be attached to one surface of the polarizing plate and a separate film may be attached to the other surface of the polarizing plate. The protect film and the separate film are used to protect the polarizing plate upon the shipment of the polarizing plate and product test.

(2) Formation of Optical Compensatory Layer (Construction of Optical Compensatory Sheet):

An optically-anisotropic layer is for compensating the liquid-crystalline compound in a liquid-crystal cell at the time of black level of display in liquid-crystal display devices, and an optical compensatory sheet may be constructed by forming an alignment film on a cellulose acylate film followed by further forming thereon an optically-anisotropic layer.

[Alignment Film]

An alignment film is provided on the cellulose acylate optical film that has been processed for surface treatment as above. The film has the function of defining the alignment direction of liquid-crystal molecules. However, if a liquid-crystalline compound can be aligned and then its alignment state can be fixed as such, then the alignment film is not indispensable as a constitutive element, and may be therefore omitted as not always needed. In this case, only the optically-anisotropic layer on the alignment film of which the alignment state has been fixed may be transferred onto a polarizing element to construct the polarizer of the invention.

The alignment film may be formed, for example, through rubbing treatment of an organic compound (preferably polymer), oblique vapor deposition of an inorganic compound, formation of a microgrooved layer, or accumulation of an organic compound (e.g., ω-tricosanoic acid, dioctadecylmethylammonium chloride, methyl stearate) according to a Langmuir-Blodgett's method (LB film). Further, there are known other alignment films that may have an alignment function through impartation of an electric field or magnetic field thereto or through light irradiation thereto.

The alignment film is preferably formed through rubbing treatment of a polymer. In principle, the polymer to be used for the alignment film has a molecular structure that has the function of aligning liquid-crystalline molecules.

Preferably, the polymer for use in the invention has a crosslinking functional group (e.g., double bond)-having side branches bonded to the backbone chain thereof or has a crosslinking functional group having the function of aligning liquid-crystalline molecules introduced into the side branches thereof, in addition to having the function of aligning liquid-crystalline molecules.

The polymer to be used for the alignment film may be a polymer that is crosslinkable by itself or a polymer that is crosslinkable with a crosslinking agent, or may also be a combination of the two. Examples of the polymer are methacrylate copolymers, styrene copolymers, polyolefins, polyvinyl alcohols and modified polyvinyl alcohols, poly(N-methylolacrylamides), polyesters, polyimides, vinyl acetate copolymers, carboxymethyl cellulose and polycarbonates, as in JP-A-8-338913, [0022]. A silane coupling agent is also usable as the polymer. Preferably, the polymer is a water-soluble polymer (e.g., poly(N-methylolacrylamide), carboxymethyl cellulose, gelatin, polyvinyl alcohol, modified polyvinyl alcohol), more preferably gelatin, polyvinyl alcohol and modified polyvinyl alcohol, most preferably polyvinyl alcohol and modified polyvinyl alcohol. Especially preferably, two different types of polyvinyl alcohols or modified polyvinyl alcohols having a different degree of polymerization are combined for use as the polymer. Preferably, the degree of saponification of polyvinyl alcohol for use herein is from 70 to 100%, more preferably from 80 to 100%. Also preferably, the degree of polymerization of polyvinyl alcohol is from 100 to 5000.

The side branches having the function of aligning liquid-crystalline molecules generally have a hydrophobic group as the functional group. Concretely, the type of the functional group may be determined depending on the type of the liquid-crystalline molecules to be aligned and on the necessary alignment state of the molecules. For example, the modifying group of modified polyvinyl alcohol may be introduced into the polymer through copolymerization modification, chain transfer modification or block polymerization modification. Examples of the modifying group are a hydrophilic group (e.g., carboxylic acid group, sulfonic acid group, phosphonic acid group, amino group, ammonium group, amide group, thiol group), a hydrocarbon group having from 10 to 100 carbon atoms, a fluorine atom-substituted hydrocarbon group, a thioether group, a polymerizing group (e.g., unsaturated polymerizing group, epoxy group, aziridinyl group), and an alkoxysilyl group (e.g., trialkoxy group, dialkoxy group, monoalkoxy group). Specific examples of such modified polyvinyl alcohol compounds are described, for example, in JP-A-2000-155216, [0022] to [0145], and in JP-A-2002-62426, [0018] to [0022].

When crosslinking functional group-having side branches are bonded to the backbone chain of an alignment film polymer, or when a crosslinking functional group is introduced into the side chains of a polymer having the function of aligning liquid-crystalline molecules, then the polymer of the alignment film may be copolymerized with the polyfunctional monomer in an optically-anisotropic layer. As a result, not only between the polyfunctional monomers but also between the alignment film polymers, and even between the polyfunctional monomer and the alignment film polymer, they may be firmly bonded to each other in a mode of covalent bonding to each other. Accordingly, introducing such a crosslinking functional group into an alignment film polymer significantly improves the mechanical strength of the resulting optical compensatory sheet.

Preferably, the crosslinking functional group of the alignment film polymer contains a polymerizing group, like the polyfunctional monomer. Concretely, for example, those described in JP-A-2000-155216, [0080] to [0100] are referred to herein. Apart from the above-mentioned crosslinking functional group, the alignment film polymer may also be crosslinked with a crosslinking agent.

The crosslinking agent includes, for example, aldehydes, N-methylol compounds, dioxane derivatives, compounds capable of being active through activation of the carboxyl group thereof, active vinyl compounds, active halide compound, isoxazoles and dialdehyde starches. Two or more different types of crosslinking agents may be combined for use herein. Concretely, for example, the compounds described in JP-A-2002-62426, [0023] to [0024] are employable herein. Preferred are aldehydes of high reactivity, and more preferred is glutaraldehyde.

Preferably, the amount of the crosslinking agent to be added to polymer is from 0.1 to 20% by mass of the polymer, more preferably from 0.5 to 15% by mass. Also preferably, the amount of the unreacted crosslinking agent that may remain in the alignment film is at most 1.0% by mass, more preferably at most 0.5% by mass. When the crosslinking agent in the alignment film is controlled to that effect, then the film ensures good durability with no reticulation even though it is used in liquid-crystal display devices for a long period of time and even though it is left in a high-temperature high-humidity atmosphere for a long period of time.

Basically, the alignment film may be formed by applying the alignment film-forming material of the above-mentioned polymer to a crosslinking agent-containing transparent support, then heating and drying it (for crosslinking it) and then rubbing the thus-formed film. The crosslinking reaction may be effected in any stage after the film-forming material has been applied onto the transparent support, as so mentioned hereinabove. When a water-soluble polymer such as polyvinyl alcohol is used as the alignment film-forming material, then it is desirable that the solvent for the coating solution is a mixed solvent of a defoaming organic solvent (e.g., methanol) and water. The ratio by mass of water/methanol preferably falls between 0/100 and 99/1, more preferably between 0/100 and 91/9. The mixed solvent of the type is effective for preventing the formation of bubbles in the coating solution and, as a result, the surface defects of the alignment film and even the optically-anisotropic layer are greatly reduced.

For forming the alignment film, preferably employed is a spin-coating method, a dip-coating method, a curtain-coating method, an extrusion-coating method, a rod-coating method or a roll-coating method. Especially preferred is a rod-coating method. Also preferably, the thickness of the film is from 0.1 to 10 μm, after dried. The drying under heat may be effected at 20 to 110° C. For sufficient crosslinking, the heating temperature is preferably from 60 to 100° C., more preferably from 80 to 100° C. The drying time may be from 1 minute to 36 hours, but preferably from 1 to 30 minutes. The pH of the coating solution is preferably so defined that it is the best for the crosslinking agent used. For example, when glutaraldehyde is used, the pH of the coating solution is preferably from 4.5 to 5.5, more preferably 5.

The alignment film is provided on the transparent support or on the undercoat layer. The alignment film may be formed by crosslinking the polymer layer as above, and then rubbing the surface of the layer.

For the rubbing treatment, usable is any method widely employed for liquid crystal alignment treatment for LCD. Concretely, for example, the surface of the alignment film is rubbed in a predetermined direction by the use of paper, gauze, felt, rubber, nylon, or polyester fibers, whereby the film may be aligned in the intended direction. In general, a cloth uniformly planted with fibers having the same length and the same thickness is used, and the surface of the film is rubbed a few times with the cloth.

On an industrial scale, the operation may be attained by contacting a rolling rubbing roll to a polarizing layer-having film that is traveling in the system. Preferably, the circularity, the cylindricity, and the deflection (eccentricity) of the rubbing roll are all at most 30 μm each. Also preferably, the lapping angle of the film around the rubbing roll is from 0.1 to 90°. However, the film may be lapped at an angle of 360° or more for stable rubbing treatment, as in JP-A-8-160430. Preferably, the film traveling speed is from 1 to 100 m/min. The rubbing angle may fall between 0 and 60°, and it is desirable that a suitable rubbing angle is selected within the range. When the film is used in liquid-crystal display devices, the rubbing angle is preferably from 40 to 50°, more preferably 45°.

The thickness of the alignment film thus obtained is preferably from 0.1 to 10 μm.

Next, the liquid-crystalline molecules of the optically-anisotropic layer are aligned on the alignment film. Afterward, if desired, the polyfunctional monomers in the alignment film polymer and the optically-anisotropic layer are reacted, or the alignment film polymer is crosslinked with a crosslinking agent.

The liquid-crystalline molecules for use in the optically-anisotropic layer include rod-shaped liquid-crystalline molecules and discotic liquid-crystalline molecules. The rod-shaped liquid-crystalline molecules and the discotic liquid-crystalline molecules may be high-molecular liquid crystals or low-molecular liquid crystals. In addition, they include crosslinked low-molecular liquid crystals that do not exhibit liquid crystallinity.

[Rod-Shaped Liquid-Crystalline Molecules]

The rod-shaped liquid-crystalline molecules are preferably azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles.

The rod-shaped liquid-crystalline molecules include metal complexes. Liquid-crystal polymers that contain rod-shaped liquid-crystalline molecules in the repetitive units thereof are also usable herein as the rod-shaped liquid-crystalline molecules. In other words, the rod-shaped liquid-crystalline molecules for use herein may bond to a (liquid-crystal) polymer.

Rod-shaped liquid-crystalline molecules are described in Quarterly Journal of General Chemistry, Vol. 22, Liquid Crystal Chemistry (1994), Chaps. 4, 7 and 11, edited by the Chemical Society of Japan; Liquid Crystal Devices Handbook, edited by the 142nd Committee of the Nippon Academic Promotion, Chap. 3.

The birefringence of the rod-shaped liquid-crystalline molecule preferably falls between 0.001 and 0.7.

Preferably, the rod-shaped liquid-crystalline molecules have a polymerizing group for fixing their alignment state. The polymerizing group is preferably a radical-polymerizing unsaturated group or a cationic polymerizing group. Concretely, for example, there are mentioned the polymerizing groups and the polymerizing liquid-crystal compounds described in JP-A-2002-62427, [0064] to [0086].

[Discotic Liquid-Crystalline Molecules]

The discotic liquid-crystalline molecules include, for example, benzene derivatives as in C. Destrade et al's study report, Mol. Cryst., Vol. 71, p. 111 (1981); truxene derivatives as in C. Destrade et al's study report, Mol. Cryst., Vol. 122, p. 141 (1985), Physics Lett. A., Vol. 78, p. 82 (1990); cyclohexane derivatives as in B. Kohne et al's study report, Angew. Chem., Vol. 96, p. 70 (1984); and azacrown-type or phenylacetylene-type macrocycles as in J. M. Lehn et al's study report, J. Chem. Commun., p. 1794 (1985), J. Zhang et al's study report, J. Am. Chem. Soc., Vol. 116, p. 2655 (1994).

The discotic liquid-crystalline molecules include liquid-crystalline compounds in which the molecular center nucleus is radially substituted with side branches of a linear alkyl, alkoxy or substituted benzoyloxy group. Preferably, the molecules or the molecular aggregates of the compounds are rotary-symmetrical and may undergo certain alignment. It is not always necessary that, in the optically-anisotropic layer formed of such discotic liquid-crystalline molecules, the compounds that are finally in the optically-anisotropic layer are discotic liquid-crystalline molecules. For example, low-molecular discotic liquid-crystalline molecules may have a group capable of being reactive when exposed to heat or light, and as a result, they may polymerize or crosslink through thermal or optical reaction to give high-molecular compounds with no liquid crystallinity. Preferred examples of the discotic liquid-crystalline molecules are described in JP-A-8-50206. Polymerization of discotic liquid-crystalline molecules is described in JP-A-8-27284.

For fixing the discotic liquid-crystalline molecules through polymerization, the discotic core of the discotic liquid-crystalline molecules must be substituted with a polymerizing group. Preferably, the polymerizing group bonds to the discotic core via a linking group. Accordingly, the compounds of the type may keep their alignment state even after their polymerization. For example, there are mentioned the compounds described in JP-A-2000-155216, [0151] to [0168].

In hybrid alignment, the angle between the major axis (disc plane) of the discotic liquid-crystalline molecules and the plane of the polarizing film increases or decreases with the increase in the distance from the plane of the polarizing film in the depth direction of the optically-anisotropic layer. Preferably, the angle decreases with the increase in the distance. The angle change may be in any mode of continuous increase, continuous decrease, intermittent increase, intermittent decrease, change including continuous increase and continuous decrease, or intermittent change including increase and decrease. The intermittent change includes a region in which the tilt angle does not change in the midway of the thickness direction. The angle may include a region with no angle change so far as it increases or decreases as a whole. Preferably, the angle continuously varies.

The mean direction of the major axis of the discotic liquid-crystalline molecules on the polarizing film side may be controlled generally by suitably selecting the material of the discotic liquid-crystalline molecules or that of the alignment film or by suitably selecting the rubbing treatment method. The direction of the major axis of the discotic liquid-crystalline molecules (disc plane) on the surface side (on the external air side) may be controlled generally by suitably selecting the material of the discotic liquid-crystalline molecules or that of the additive to be used along with the discotic liquid-crystalline molecules. Examples of the additive that may be used along with the discotic liquid-crystalline molecules include, for example, plasticizer, surfactant, polymerizing monomer and polymer. Like in the above, the degree of the change of the major axis in the alignment direction may also be controlled by suitably selecting the liquid-crystalline molecules and the additive.

[Other Composition of Optically-Anisotropic Layer]

Along with the above-mentioned liquid-crystalline molecules, a plasticizer, a surfactant, a polymerizing monomer and others may be added to the optically-anisotropic layer for improving the uniformity of the coating film, the strength of the film and the alignment of the liquid-crystalline molecules in the film. Preferably, the additives have good compatibility with the liquid-crystalline molecules that constitute the layer and may have some influence on the tilt angle change of the liquid-crystalline molecules, not interfering with the alignment of the molecules.

The polymerizing monomer includes radical-polymerizing or cationic-polymerizing compounds. Preferred are polyfunctional radical-polymerizing monomers. Also preferred are those copolymerizable with the above-mentioned, polymerizing group-containing liquid-crystal compounds. For example, herein mentioned are the compounds described in JP-A-2002-296423, [0018] to [0020]. The amount of the compound to be added to the layer may be generally from 1 to 50% by mass of the discotic liquid-crystalline molecules in the layer, but preferably from 5 to 30% by mass.

The surfactant may be any known one, but is preferably a fluorine-containing compound. Concretely, for example, there are mentioned the compounds described in JP-A-2001-330725, [0028] to [0056].

The polymer that may be used along with the discotic liquid-crystalline molecules is preferably one capable of changing the tilt angle of the discotic liquid-crystalline molecules.

Examples of the polymer are cellulose esters. Preferred examples of cellulose esters are described in JP-A-2000-155216, [0178]. So as not to interfere with the alignment of the liquid-crystalline molecules in the layer, the amount of the polymer to be added to the layer is preferably from 0.1 to 10% by mass of the liquid-crystalline molecules, more preferably from 0.1 to 8% by mass.

Preferably, the discotic nematic liquid-crystal phase/solid phase transition temperature of the discotic liquid-crystalline molecules falls between 70 and 300° C., more preferably between 70 and 170° C.

[Formation of Optically-Anisotropic Layer]

The optically-anisotropic layer may be formed by applying a coating solution that contains liquid-crystalline molecules and optionally a polymerization initiator and other optional components mentioned below, on the alignment film.

The solvent to be used in preparing the coating solution is preferably an organic solvent. Examples of the organic solvent are amides (e.g., N,N-dimethylformamide), sulfoxides (e.g., dimethylsulfoxide), heterocyclic compounds (e.g., pyridine), hydrocarbons (e.g., benzene, hexane), alkylhalides (e.g., chloroform, dichloromethane, tetrachloroethane), esters (e.g., methyl acetate, butyl acetate), ketones (e.g., acetone, methyl ethyl ketone), ethers (e.g., tetrahydrofuran, 1,2-dimethoxyethane). Of those, preferred are alkyl halides and ketones. Two or more such organic solvents may be used as combined.

The coating solution may be applied onto the alignment film in any known method (e.g., wire bar coating, extrusion coating, direct gravure coating, reverse gravure coating, die coating).

The thickness of the optically-anisotropic layer is preferably from 0.1 to 20 µm, more preferably from 0.5 to 15 µm, most preferably from 1 to 10 µm.

[Fixation of Alignment State of Liquid-Crystalline Molecules]

The aligned liquid-crystalline molecules may be fixed as they are in an alignment state. Preferably, the fixation is effected through polymerization. The polymerization includes thermal polymerization with a thermal polymerization initiator and optical polymerization with an optical polymerization initiator. Preferred is optical polymerization.

The optical polymerization initiator includes, for example, α-carbonyl compounds (as in U.S. Pat. Nos. 2,367,661, 2,367,670), acyloin ethers (as in U.S. Pat. No. 2,448,828), α-hydrocarbon-substituted aromatic acyloin compounds (as in U.S. Pat. No. 2,722,512), polynuclear quinone compounds (as in U.S. Pat. Nos. 3,046,127, 2,951,758), combination of triarylimidazole dimer and p-aminophenyl ketone (as in U.S. Pat. No. 3,549,367), acridine compounds and phenazine compounds (as in JP-A-60-105667, U.S. Pat. No. 4,239,850), and oxadiazole compounds (as in U.S. Pat. No. 4,212,970).

The amount of the optical polymerization initiator to be added is preferably from 0.01 to 20% by mass of the solid content of the coating solution, more preferably from 0.5 to 5% by mass.

Preferably, UV rays are used for light irradiation for polymerization of liquid-crystalline molecules.

Preferably, the irradiation energy falls within a range of from 20 mJ/cm$^2$ to 50 J/cm$^2$, more preferably from 20 to 5000 mJ/cm$^2$, even more preferably from 100 to 800 mJ/cm$^2$. For promoting the optical polymerization, the light irradiation may be effected under heat. A protective layer may be provided on the optically-anisotropic layer.

Preferably, the optical compensatory film may be combined with a polarizing film. Concretely, the above-mentioned optically-anisotropic layer-coating solution is applied onto the surface of a polarizing film to from an optically-anisotropic layer thereon. As a result, no polymer film exists between the polarizing film and the optically-anisotropic layer, and a thin polarizer is thus constructed of which the stress (strain×cross section×elasticity) to be caused by the dimensional change of the polarizing film is reduced. When the polarizer of the invention is fitted to large-size liquid-crystal display devices, then it does not produce a problem of light leakage and the devices can display high-quality images.

Preferably, the polarizing film and the optically-compensatory layer are so stretched that the tilt angle between the two may correspond to the angle formed by the transmission axis of the two polarizers to be stuck to both sides of the liquid crystal cell to constitute liquid crystal display device, and the machine direction or the transverse direction of the liquid crystal cells. In general, the tilt angle is 45°. Recently, however, some devices in which the tile angle is not always 45° have been developed for transmission-type, reflection-type or semi-transmission-type liquid crystal display devices, and it is desirable that the stretching direction is varied in any desired manner depending on the plan of liquid crystal display devices.

(3) Antireflection Layer (Antireflection Film)

In general, an antireflection film is constructed by forming a low-refractivity layer that functions as a stain-preventing layer, and at least one layer having a higher refractivity than that of the low-refractivity layer (high-refractivity layer or middle-refractivity layer) on a transparent substrate.

A multi-layer film is formed by laminating transparent thin films of inorganic compounds (e.g., metal oxides) having a different refractivity, for example, in a mode of chemical vapor deposition (CVD) or physical vapor deposition (PVD); or a film of colloidal metal oxide particles is formed according to a sol-gel process with a metal compound such as a metal oxide, and then this is post-treated (e.g., UV irradiation as in JP-A-9-157855, or plasma treatment as in JP-A-2002-327310) to give a thin film.

On the other hand, various types of antireflection films of high producibility are proposed, which are formed by laminating thin films of inorganic particles dispersed in a matrix. The antireflection films produced according to the above-mentioned coating methods may be further processed so that the surface of the outermost layer thereof is roughened to have an antiglare property.

The cellulose acylate film of the invention may be applied to any type as above. Especially preferably, the film is applied to film construction in a layers-coating system (layers-coated films).

[Layer Constitution of Layers-Coated Antireflection Film]

The antireflection film having a layer constitution of at least a middle-refractivity layer, a high-refractivity layer and a low-refractivity layer (outermost layer) formed in that order on a substrate is so planned that it satisfies the refractivity profile mentioned below.

Refractivity of high-refractivity layer>refractivity of middle-refractivity layer>refractivity of transparent support>refractivity of low-refractivity layer.

A hard coat layer may be disposed between the transparent support and the middle-refractivity layer.

Further, the film may comprise a middle-refractivity hard coat layer, a high-refractivity layer and a low-refractivity layer.

For example, JP-A-8-122504, JP-A-8-110401, JP-A-10-300902, JP-A-2002-243906, JP-A-2000-111706 are referred to. The constitutive layers may have other functions. For example, there are mentioned a stain-resistant low-refractivity layer and an antistatic high-refractivity layer (for example, as in JP-A-10-206603, JP-A-2002-243906).

Preferably, the haze of the antireflection film is at most 5%, more preferably at most 3%. Also preferably, the strength of the film is at least 1H measured in the pencil hardness test according to JIS K5400, more preferably at least 2H, most preferably at least 3H.

[High-Refractivity Layer and Middle-Refractivity Layer]

The high-refractivity layer of the antireflection film is formed of a cured film that contains at least ultrafine particles of an inorganic compound of high refractivity having a mean particle size of at most 100 nm and a matrix binder.

The high-refractivity inorganic compound particles are those of an inorganic compound having a refractivity of at least 1.65, preferably at least 1.9. The inorganic compound particles are, for example, those of a metal oxide with any of Ti, Zn, Sb, Sn, Zr, Ce, Ta, La and In, and those of a composite oxide with such metal atoms.

For example, the ultrafine particles may be processed with a surface-treating agent (e.g., silane coupling agent as in JP-A-11-295503, JP-A-11-153703, JP-A-2000-9908; anionic compound or organic metal coupling agent as in JP-A-2001-310432); or they may have a core/shell structure in which the core is a high-refractivity particle (e.g., as in JP-A-2001-166104); or they may be combined with a specific dispersant (e.g., as in JP-A-11-153703, U.S. Pat. No. 6,210, 858 B1, JP-A-2002-2776069).

The material to from the matrix may be any known thermoplastic resin or curable resin film.

For the material, also preferred is at least one composition selected from a polyfunctional compound-containing composition in which the compound has at least two radical-polymerizing and/or cationic-polymerizing groups, and a composition of a hydrolyzing group-containing organic metal compound or its partial condensate. For these compounds, for example, referred to are the compounds described in JP-A-2000-47004, JP-A-2001-315242, JP-A-2001-31871 and JP-A-2001-296401.

Also preferred is a curable film formed of a colloidal metal oxide obtained from a hydrolyzed condensate of a metal alkoxide, and a metal alkoxide composition. For example, it is described in JP-A-2001-293818.

The refractivity of the high-refractivity layer is generally from 1.70 to 2.20. Preferably, the thickness of the high-refractivity layer is from 5 nm to 10 μm, more preferably from 10 nm to 1 μm.

The refractivity of the middle-refractivity layer is so controlled that it may be between the refractivity of the low-refractivity layer and that of the high-refractivity layer. The middle-refractivity layer has the same composition as the high-refractivity layer without its refractivity. Preferably, the refractivity of the middle-refractivity layer is from 1.50 to 1.70.

[Low-Refractivity Layer]

The low-refractivity layer is laminated on the high-refractivity layer in order. The refractivity of the low-refractivity layer may be, for example, from 1.20 to 1.55, but preferably from 1.30 to 1.50.

Preferably, the low-refractivity layer is constructed as the outermost layer having good scratch resistance and good stain resistance. For significantly increasing the scratch resistance of the layer, it is effective to lubricate the surface of the layer. For it, for example, employable is a method of forming a thin layer that contains a conventional silicone compound or fluorine-containing compound introduced thereinto.

Preferably, the refractivity of the fluorine-containing compound is from 1.35 to 1.50, more preferably from 1.36 to 1.47. Also preferably, the fluorine-containing compound has a crosslinking or polymerizing functional group that contains a fluorine atom in an amount of from 35 to 80% by mass.

For example, herein usable are the compounds described in JP-A-9-222503, [0018] to [0026]; JP-A-11-38202, [0019] to [0030]; JP-A-2001-40284, [0027] to [0028]; JP-A-2000-284102.

Preferably, the silicone compound has a polysiloxane structure in which the polymer chain contains a curable functional group or a polymerizing functional group, and it forms a film having a crosslinked structure therein. For example, it includes reactive silicones (e.g., Silaplane by Chisso), and polysiloxanes double-terminated with a silanol group (as in JP-A-11-258403).

Preferably, the crosslinking or polymerizing group-having, fluorine-containing and/or siloxane polymer is crosslinked or polymerized simultaneously with or after the coating operation with the coating composition to form the outermost layer that contains a polymerization initiator and a sensitizer, by exposing the coating layer to light or heat.

Also preferred is a sol-gel curable film which comprises an organic metal compound such as a silane coupling agent and a specific fluorine-containing hydrocarbon group-having silane coupling agent and in which they are condensed in the presence of a catalyst to cure the film.

For example, there are mentioned a polyfluoroalkyl group-containing silane compound or its partial hydrolyzed condensate (as in JP-A-58-142958, JP-A-58-147483, JP-A-58-147484, JP-A-9-157582, JP-A-11-106704), and a silyl compound having a fluorine-containing long-chain group, poly(perfluoroalkylether) group (as in JP-A-2000-117902, JP-A-2001-48590, JP-A-2002-53804).

As other additives than the above, the low-refractivity layer may contain a filler (e.g., low-refractivity inorganic compound of which the primary particles have a mean particle size of from 1 to 150 nm, such as silicon dioxide (silica), fluorine-containing particles (magnesium fluoride, calcium fluoride, barium fluoride); organic fine particles described in JP-A-11-3820, [0020] to [0038]), a silane coupling agent, a lubricant, a surfactant, etc.

When the low-refractivity layer is positioned below an outermost layer, then it may be formed according to a vapor-phase process (e.g., vacuum evaporation, sputtering, ion plating, plasma CVD). However, a coating method is preferred as it produces the layer at low costs.

Preferably, the thickness of the low-refractivity layer is from 30 to 200 nm, more preferably from 50 to 150 nm, most preferably from 60 to 120 nm.

[Hard Coat Layer]

A hard coat layer may be disposed on the surface of a transparent support for increasing the physical strength of the antireflection film to be thereon. In particular, the layer is preferably disposed between a stretched or unstretched cellulose acylate film and the above-mentioned high-refractivity layer. It is also preferable that the hard coat layer is disposed directly on the unstretched or stretched cellulose acylate film without the anti-reflecting layer.

Also preferably, the hard coat layer is formed through crosslinking or polymerization of an optical and/or thermal curable compound. The curable functional group is preferably a photopolymerizing functional group, and the hydrolyzing functional group-containing organic metal compound is preferably an organic alkoxysilyl compound.

Specific examples of the compounds may be the same as those mentioned hereinabove for the high-refractivity layer.

Specific examples of the constitutive composition for the hard coat layer are described in, for example, JP-A-2002-144913, JP-A-2000-9908, and WO00/46617.

The high-refractivity layer may serve also as a hard coat layer. In such a case, it is desirable that fine particles are added to and finely dispersed in the hard coat layer in the same manner as that mentioned hereinabove for the formation of the high-refractivity layer.

Containing particles having a mean particle size of from 0.2 to 10 μm, the hard coat layer may serve also as an antiglare layer (this will be mentioned hereinunder) having an antiglare function.

The thickness of the hard coat layer may be suitably determined in accordance with the use thereof. Preferably, for example, the thickness of the hard coat layer is from 0.2 to 10 μm, more preferably from 0.5 to 7 μm. Preferably, the strength of the hard coat layer is at least 1H as measured in the pencil hardness test according to JIS K5400, more preferably at least 2H, most preferably at least 3H. Also preferably, the abrasion of the test piece of the layer before and after the taper test according to JIS K5400 is as small as possible.

[Front-Scattering Layer]

A front-scattering layer may be provided for improving the viewing angle on the upper and lower sides and on the right and left sides of liquid-crystal display devices to which the film is applied. Fine particles having a different refractivity may be dispersed in the hard coat layer, and the resulting hard coat layer may serve also as a front-scattering layer. For it, for example, referred to are JP-A-11-38208 in which the front-scattering coefficient is specifically defined; JP-A-2000-199809 in which the relative refractivity of transparent resin and fine particles is defined to fall within a specific range; and JP-A-2002-107512 in which the haze value is defined to be at least 40%.

[Other Layers]

In addition to the above-mentioned layers, the film may further has a primer layer, an antistatic layer, an undercoat layer, a protective layer, etc.

[Coating Method]

The constitutive layers of the antireflection film may be formed in various coating methods of, for example, dip coating, air knife coating, curtain coating, roller coating, wire bar coating, gravure coating, microgravure coating or extrusion coating (as in U.S. Pat. No. 2,681,294).

[Antiglare Function]

The antireflection film may have an antiglare function of scattering external light. The film may have the antiglare function by roughening its surface. When the antireflection film has the antiglare function, then its haze is preferably from 3 to 30%, more preferably from 5 to 20%, most preferably from 7 to 20%.

For roughening the surface of the antireflection film, employable is any method in which the roughened surface profile may be kept well. For example, there are mentioned a method of adding fine particles to a low-refractivity layer so as to roughen the surface of the layer (e.g., as in JP-A-2000-271878); a method of adding a small amount (from 0.1 to 50% by mass) of relatively large particles (having a particle size of from 0.05 to 2 μm) to the lower layer (high-refractivity layer, middle-refractivity layer or hard coat layer) below a low-refractivity layer to thereby roughen the surface of the lower layer, and forming a low-refractivity layer on it while keeping the surface profile of the lower layer (e.g., as in JP-A-2000-281410, JP-A-2000-95893, JP-A-2001-100004, JP-A-2001-281407); and a method of physically transferring a roughened profile onto the surface of the outermost layer (stain-resistant layer) (for example, according to embossing treatment as in JP-A-63-278839, JP-A-11-183710, JP-A-2000-275401).

<<Liquid Crystal Display Device>>

The liquid crystal display device according to the present invention is formed using the polarizing plate, the optical compensatory film, and the anti-reflection film. Each liquid crystal mode using the film will be described.

(TN-Mode Liquid-Crystal Display Device)

A TN-mode liquid-crystal display device is most popularly utilized in color TFT liquid-crystal display devices, and this is described in a large number of references. The alignment state in the liquid-crystal cell at the time of black level of TN-mode display is as follows: The rod-shaped liquid-crystalline molecules stand up in the center of the cell, and they lie down at around the substrate of the cell.

(OCB-Mode Liquid-Crystal Display Device)

OCB-mode liquid-crystal display device is a bent-alignment mode liquid-crystal cell in which the rod-shaped liquid-crystalline molecules are aligned substantially in the opposite directions (symmetrically) between the upper part and the lower part of the liquid-crystal cell. The liquid-crystal display device that comprises such a bent-alignment mode liquid-crystal cell is disclosed in U.S. Pat. Nos. 4,583,825 and 5,410,422. In this, since the rod-shaped liquid-crystalline molecules are symmetrically aligned in the upper part and the lower part of the liquid-crystal cell, the bent-alignment mode liquid-crystal cell has a self-optically-compensatory function. Accordingly, the liquid-crystal mode of the type is referred to as an OCB (optically-compensatory bent) liquid-crystal mode.

Regarding the alignment state at the time of black level of display in the OCB-mode liquid-crystal cell, the rod-shaped liquid-crystalline molecules stand up in the center of the cell, and they lie down at around the substrate of the cell, like in the TN-mode liquid-crystal cell.

(VA-mode Liquid-Crystal Display Device)

VA-mode liquid-crystal display device is characterized in that the rod-shaped liquid-crystalline molecules therein are substantially vertically aligned in the absence of voltage application thereto. The VA-mode liquid-crystal cell includes (1) a VA-mode liquid-crystal cell in the narrow sense of the word, in which the rod-shaped liquid-crystalline molecules are substantially vertically aligned in the absence of voltage application thereto but are substantially horizontally aligned in the presence of voltage application thereto (as in JP-A-2-176625), further including in addition to it, (2) a multi-domain VA-mode (MVA-mode) liquid crystal cell for viewing angle expansion (as in SID97, Digest of Tech. Papers (preprint), 28 (1997) 845), (3) an n-ASM-mode liquid-crystal cell in which the rod-shaped liquid-crystalline molecules are substantially vertically aligned in the absence of voltage application thereto but are subjected to twisted multi-domain alignment in the presence of voltage application thereto (as in the preprint in the Nippon Liquid Crystal Discussion Meeting, 58-59 (1998)), and (4) a SURVIVAL-mode liquid-crystal cell (as announced in LCD International 98).

(IPS-mode Liquid Crystal Display Device)

An IPS-mode liquid crystal display device is characterized in that rod-shaped liquid-crystalline molecules are substantially horizontally aligned in an in-plane direction with no application of a voltage and this alignment changes an alignment direction of liquid crystal in accordance with whether a voltage is applied or not for switching. Specifically, the liquid crystal display devices described in JP-A-2004-365941, JP-A-2004-12731, JP-A-2004-215620, JP-A-2002-221726, JP-A-2002-55341, and JP-A-2003-195333 are employable herein.

(Other Liquid Crystal Display Device)

With respect to an ECB mode, a Super Twisted Nematic (STN) mode, a Ferroelectric Liquid Crystal (FLC) mode, an Anti-ferroelectric Liquid Crystal (AFLC) mode, or an Axially Symmetric Aligned Microcell (ASM) mode, optical compensatory can be accomplished by the same idea. In addition, this is efficient in a transmissive, reflective, or transreflective liquid crystal display device. It is advantageously used as an optical compensatory sheet of the Guest-Host (GH) reflective liquid crystal display device.

The use of the cellulose derivative film which is described up to now is described in detail in 45 to 59 pages of the open technical report of Japan Institute of Invention and Innovation (Open technique No. 2001-1745, issued on Mar. 15, 2001, Japan Institute of Invention and Innovation).

[Use]

The cellulose acylate film according to the present invention is used in an optical film, and, more particularly, an optical compensatory sheet (also called a retardation film) of a liquid crystal display device, an optical compensatory sheet of a reflective liquid crystal display device, and a support medium for a halogenated photographic sensitive material as a protective film of a polarizing plate.

Hereinafter, the measurement used in the present invention will be described.

(1) Shear Rate Dependency of Melt Viscosity and Melt Viscosity i) Shear Rate Dependency of Melt Viscosity This is measured using a cone-plate viscometer (a modular compact rheometer made by Anton Paar: Physica MCR301) under the following condition.

After resin is sufficiently dried such that the percentage of water content is reduced to 0.1% or less, it is measured at a shear rate having a range of 0.001 to 100 (/sec) and a temperature of 220° C., and a gap of 500 μm.

The following formulae are obtained from melt viscosity $\eta 1$ at a shear rate 1 (/sec) and melt viscosity $\eta 100$ at a shear rate 100 (/sec).

Shear rate dependency of melt viscosity=log($\eta 1/\eta 100$)

ii) Melt Viscosity

In the measurement of i), the viscosity at the shear rate (1/sec) was the melt viscosity.

iii) Temperature Dependency of Melt Viscosity

It is measured under the following condition using a capillary type viscometer (for example, made by Shimadzu Corporation: capillary rheometer CFT-500D).

After resin is sufficiently dried such that the percentage of water content is reduced to 0.1% or less, it is measured using a capillary having a hole length of 1.0 mm and a hole diameter of 0.5 mm, a load of 10 kg, and a temperature of 150° C. to 300° C. for 6° C./min.

The following formula is obtained from melt viscosity η190 measured at 190° C. and melt viscosity η240 measured at 240° C.

Temperature dependency of melt viscosity=log (η190/η240)

(2) Substitution Degree of Cellulose Acylate:

The substitution degree and their 6-position substitution ratio for an acyl group of cellulose acylate is obtained through $^{13}$C-NMR, according to the method described in Carbohydr. Res. 273 (1995), 83-91 (Tezuka et al.)

(3) Re and Rth 10 points were sampled at regular intervals in a film-width direction, and were air conditioned at a temperature of 25° C. and a relative humidity of 60% for 4 hours. Then, retardation were measured at a temperature of 25° C. and a relative humidity of 60% by an automatic double refraction meter (KOBRA-21ADH: manufactured by Oji Scientific Instruments) so as to measure the retardation (Re) in an in-plane direction and the retardation (Rth) in a film thickness direction.

(4) Quantity of Remaining Sulfuric Acid

A 300-mg sample is molten in 30-ml dichloromethane. This is measured by an atomic absorption method in view of sulfur. In addition, a standard addition method was quantitatively used. The measured quantity of sulfur can be obtained as the reduced quantity of sulfur per unit cellulose acylate (represented by a mass ratio (ppm) obtained by multiplying the mol concentration of sulfur in unit mass of the cellulose acylate by the atomic mass of sulfuric acid).

(5) Content of Acetic Acid, Propionic acid, Butyric Acid and Valeric Acid

A 300-mg sample is molten in 30-ml dichloromethane. This is measured by a gas chromatography (GC) under the following condition. In addition, an analytical curve is quantitatively formed using a sample.

Column: DB-WAX (0.25 mmφ×30 m, film thickness 0.25 μm)
Column temperature: 150° C.
Carrier gas: Nitrogen
Sample injection amount: 1 μl
vaporizing chamber: 280° C.
Detector: FID (6) Quantity of Na A 300-mg sample is molten in 30-ml dichloromethane. This is measured by an atomic absorption method in view of Na. In addition, a standard addition method was quantitatively used. The measured quantity of Na can be obtained as the quantity of Na per unit cellulose acylate (represented by a mass ratio (ppm) obtained by multiplying the mol concentration of Na in unit mass of the cellulose acylate by the atomic mass of Na).

EXAMPLES

The invention is described more concretely with reference to the following Examples and Comparative Examples. In the following Examples, the material used, its amount and ratio, the details of the treatment and the treatment process may be suitably modified or changed not overstepping the gist and the scope of the invention. Accordingly, the invention should not be limited to the Examples mentioned below.

Example 1

1. Formation of Cellulose Acylate Film
(1) Manufacture of Cellulose Acylate

Cellulose acylates having different types or substitution degrees for acyl groups shown in Table 1 were manufactured. Sulfuric acid (7.8 parts by mass to 100 parts by mass of cellulose) was added as a catalyst, carboxylic acid which is a raw material of an acyl substituent was added, and an acylation reaction was performed at 40° C. At this time, the type and the substitution degree for the acyl group were adjusted by adjusting the type and the quantity of carboxylic acid.

21 parts by mass of an aqueous solution of carboxylic acid (at least one of acetic acid, propionic acid, butyric acid and valeric acid according to a ratio of an acyl group to the cellulose acylate shown in Table 1) was added to the solution of synthesized cellulose acylate and the mixture was maintained for 90 minutes at a temperature of 47° C., thereby maturing cellulose acetate. By changing a ratio of carboxylic acid to water, a 6-position acylation ratio shown in Table 1 waste adjusted. In a mixture ratio, the aqueous solution of carboxylic acid (acyl group donor) was 1680 parts by mass and sulfuric acid (catalyst) was 22.6 parts by mass, with respect to 499 parts by mass of cellulose acylate. The obtained solution of cellulose acylate was matured at 40° C. By changing the maturing time, other samples having different polymerization degrees shown in Table 1 (measured by the following method) were manufactured (the polymerization degree is reduced if the maturing time increases). Thereafter, neutralization was performed using 24% by mass of an aqueous solution of magnesium acetate and sulfuric acid (catalyst) was deactivated. Thereafter, the sample was contained and agitated in a mixture of water and acetic acid (mass ratio of 70:30) to be solidified. This was cleaned while being agitated in hot water of 70° C. By changing the cleaning time, samples having different quantities of sulfuric acid were manufactured. Obtained precipitation was filtered and cleaned in flowing water, was subjected to centrifugal deliquoring, and was dried at 50° C., thereby obtaining cellulose acylate.

(Polymerization Degree Measuring Method)

About 0.2 g of bone-dry cellulose acylate was precisely weighed and was molten in 100 ml of a mixed solvent of methylene chloride and ethanol having a mass ratio of 9:1. The time in seconds required for the falling was measured by Ostwald's viscosity meter at 25° C. to obtain the polymerization degree by the following formulae.

$$\eta_{rel}=T/T_0$$

$$[\eta]=ln(\eta_{rel})/C$$

$$DP=[\eta]/Km$$

[In formulae, T denotes the time in seconds required for the falling of the measured sample, $T_0$ denotes the time in seconds required for the falling of a solvent, ln denotes a natural log, C denotes a concentration (g/L), and Km denotes $6\times10^{-4}$.

(2) Pelletization of Cellulose Acylate

The obtained cellulose acylate was dried for 3 hours at 100° C. such that the percentage of water content becomes 0.1% by mass or less and an optical adjuster (retardation preparation agent) was added by the quantity shown in Table 1. In addition, sodium carbonate was added to become the quantity of Na shown in Table 1.

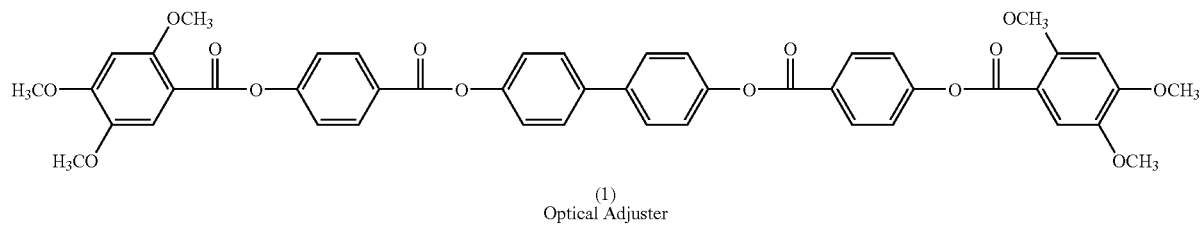

(1)
Optical Adjuster

As a plasticizing agent, any one of the following was added as shown in Table 1.

Plastic agent A: polyethyleneglycol (molecular weight: 600)

Plastic agent B; glycerindiacetateolayteoleate

Plastic agent C: Compound of an example A of PCT Japanese Translation Patent Publication No. 6-501040(Di-TPP)

In addition, any one of acetic acid, propionic acid and butyric acid was added such that content ratio of the film becomes the value of Table 1.

0.05% by mass of Silicon dioxide particles (AEROSIL R972v), and an ultraviolet [UV] absorbent (0.05% by mass of 2-(2'-hydroxy-3', 5-di-t-butylphenyl)-benzotriazole, 0.1% of 2,4-hydroxy-4-methoxy-benzophenone) were added to all levels.

These are discharged from the die at a screw rotation speed of 300 rpm, a kneading time of 40 sec, and an extrusion quantity of 200 kg/hr using a biaxial kneading extruder attached with evacuation, are solidified in water of 60° C., and are cut, thereby obtaining a pellet having a cylindrical shape having a diameter of 2 mm and a length of 3 mm.

(3) Melt-Casting Film Formation

The cellulose acylate pellets prepared by the method were dried for 3 hours by a vacuum dryer at 100° C. The pellets were added to a hopper at 80° C. The diameter (outlet side) of the screw employed at this stage was 60 mm, L/D was 40, and the compression ratio was 3.5. The temperature of the barrel was set so as to adjust the temperatures of the outlet and inlet thereof to be the highest temperature (220° C.) and the lowest temperature (150° C.), respectively.

After melting, a melt which cellulose acylate palette was melted was filtered by a 3 μm filter, extruded through a die having a slit with a gap of 0.8 mm, and then was solidified using a casting drum at a temperature of (Tg–10)° C. In this step, an electrostatic application method (a 10 kV wire was disposed on a position apart from the landing point of the melt on the casting drum by 10 cm) was used to apply static electricity at both ends by 10 cm. The solidified melt was peeled off from the casing drum, and immediately before taking up, trimmed at both ends thereof (5% of the overall width at each end) and processed (knurled) at both ends to a width of 10 mm and a height of 50 μm. Then, 3000 m of the film was taken up at a rate of 30 m/min. The width of the unstretched film obtained in this manner was 1.5 m.

TABLE 1

| | Cellulose acylate | | | | | | | |
|---|---|---|---|---|---|---|---|---|
| | Substitution degree | | | | | | | |
| | Acetyl group (X) | propionyl group (Y1) | butyryl group (Y2) | pentanoyl group (Y3) | Sum of Y (Y1-3) | X + Y | 6-position acylation | Polymerization degree |
| Present invention 1 | 0.1 | 2.6 | | | 2.6 | 2.7 | 0.92 | 180 |
| Present invention 2 | 0.1 | 2.6 | | | 2.6 | 2.7 | 0.90 | 180 |
| Present invention 3 | 0.1 | 2.6 | | | 2.6 | 2.7 | 0.99 | 180 |
| Present invention 4 | 0.1 | 2.6 | | | 2.6 | 2.7 | 0.88 | 180 |
| Present invention 5 | 0.1 | 2.6 | | | 2.6 | 2.7 | 0.92 | 180 |
| Present invention 6 | 0.1 | 2.6 | | | 2.6 | 2.7 | 0.92 | 180 |
| Present invention 7 | 0.1 | 2.6 | | | 2.6 | 2.7 | 0.92 | 180 |
| Present invention 8 | 0.1 | 2.6 | | | 2.6 | 2.7 | 0.92 | 180 |
| Present invention 9 | 0.1 | 2.6 | | | 2.6 | 2.7 | 0.92 | 180 |
| Present invention 10 | 0.1 | 2.6 | | | 2.6 | 2.7 | 0.92 | 180 |
| Present invention 11 | 0.1 | 2.6 | | | 2.6 | 2.7 | 0.92 | 180 |
| Present invention 12 | 0.1 | 2.6 | | | 2.6 | 2.7 | 0.92 | 180 |
| Present invention 13 | 0.1 | 2.6 | | | 2.6 | 2.7 | 0.92 | 180 |
| Comparative example 1 | 0.1 | 2.6 | | | 2.6 | 2.7 | 0.88 | 180 |
| Present invention 14 | 0.1 | 2.6 | | | 2.6 | 2.7 | 0.92 | 180 |
| Present invention 15 | 0.1 | 2.6 | | | 2.6 | 2.7 | 0.92 | 180 |
| Present invention 16 | 0.1 | 2.6 | | | 2.6 | 2.7 | 0.92 | 180 |
| Present invention 17 | 0.1 | 2.6 | | | 2.6 | 2.7 | 0.93 | 110 |
| Present invention 18 | 0.1 | 2.6 | | | 2.6 | 2.7 | 0.93 | 380 |
| Present invention 19 | 0.7 | 1.3 | | | 1.3 | 2.0 | 0.90 | 180 |
| Presant invention 20 | 0.6 | 1.8 | | | 1.8 | 2.4 | 0.90 | 180 |
| Present invention 21 | 0.5 | 2.4 | | | 2.4 | 2.9 | 0.98 | 180 |
| Present invention 22 | 0.1 | 2.9 | | | 2.9 | 3.0 | 0.97 | 180 |
| Present invention 23 | 1.7 | 1.2 | | | 1.2 | 2.9 | 0.98 | 180 |
| Present invention 24 | 1.2 | 1.6 | | | 1.6 | 2.8 | 0.93 | 250 |
| Present invention 25 | 1.2 | | 1.6 | | 1.6 | 2.8 | 0.93 | 250 |
| Present invention 26 | 1.6 | | 1.2 | | 1.2 | 2.8 | 0.92 | 210 |

TABLE 1-continued

| | | | | | | | | |
|---|---|---|---|---|---|---|---|---|
| Present invention 27 | 1.2 | | 2.7 | | 2.7 | 2.9 | 0.98 | 210 |
| Present invention 28 | 1.0 | | 1.0 | 0.7 | 1.7 | 2.7 | 0.91 | 210 |
| Present invention 29 | 0.1 | 2.6 | | | 2.6 | 2.7 | 0.93 | 180 |
| Comparative example 2 | 0.1 | 2.6 | | | 2.6 | 2.7 | 0.85 | 180 |

| | Plasticizing agent | | Quantaty of optical adjuster (%) | Other composition | | | |
|---|---|---|---|---|---|---|---|
| | | | | Quantaty of remaining sulfuric acid (ppm) | Carboxylic acid | | Content ratio of Na (ppm) |
| | Type[1] | Added quantity (%) | | | type[2] | Content ratio (ppm) | |
| Present invention 1 | B | 10 | 0 | 30 | P | 200 | 30 |
| Present invention 2 | B | 10 | 0 | 30 | P | 200 | 30 |
| Present invention 3 | B | 10 | 0 | 30 | P | 200 | 30 |
| Present invention 4 | B | 10 | 0 | 30 | P | 200 | 30 |
| Present invention 5 | B | 10 | 0 | 0 | P | 300 | 60 |
| Present invention 6 | B | 10 | 0 | 90 | P | 300 | 60 |
| Present invention 7 | B | 10 | 0 | 120 | P | 300 | 60 |
| Present invention 8 | B | 10 | 0 | 40 | P | 5 | 90 |
| Present invention 9 | B | 10 | 0 | 40 | P | 480 | 90 |
| Present invention 10 | B | 10 | 0 | 40 | — | 0 | 90 |
| Present invention 11 | B | 10 | 0 | 60 | P | 100 | 5 |
| Present invention 12 | B | 10 | 0 | 60 | P | 100 | 180 |
| Present invention 13 | B | 10 | 0 | 60 | P | 100 | 0 |
| Comparative example 1 | B | 10 | 0 | 120 | — | 0 | 0 |
| Present invention 14 | B | 10 | 0 | 80 | — | 0 | 0 |
| Present invention 15 | B | 10 | 0 | 80 | P | 300 | 0 |
| Present invention 16 | B | 10 | 0 | 80 | P | 300 | 60 |
| Present invention 17 | None | 0 | 0 | 50 | P | 150 | 50 |
| Present invention 18 | A | 20 | 0 | 50 | P | 150 | 50 |
| Present invention 19 | A | 5 | 0 | 40 | P | 350 | 140 |
| Present invention 20 | A | 5 | 0 | 40 | P | 350 | 140 |
| Present invention 21 | A | 5 | 0 | 40 | P | 350 | 140 |
| Present invention 22 | A | 5 | 0 | 40 | P | 350 | 140 |
| Present invention 23 | A | 5 | 0 | 40 | P | 350 | 140 |
| Present invention 24 | B | 14 | 8 | 20 | A | 150 | 40 |
| Present invention 25 | B | 14 | 8 | 20 | A | 150 | 40 |
| Present invention 26 | B | 14 | 5 | 60 | B | 400 | 120 |
| Present invention 27 | B | 14 | 5 | 60 | B | 400 | 120 |
| Present invention 28 | B | 14 | 5 | 60 | B | 400 | 120 |
| Present invention 29 | C | 3 | 0 | 20 | P | 300 | 50 |
| Comparative example 2 | C | 3 | 0 | 200 | — | 0 | 0 |

1) Type of plasticizing agent
   A: polyethyleneglycol (molecular weight: 600)
   B: glycerindiacetateoleate
   C: Compound of Example A of JP-T-6-501040 (Di-TPP)

2) Type of carboxylic acid
   A: acetic acid
   B: butyric acid
   P: propionic acid

TABLE 2

| | Melt property | | | Undrawn film | | | | |
|---|---|---|---|---|---|---|---|---|
| | Melt viscosity (Pa·s) | Shear rate dependency of melt viscosity | Temperature dependency of melt viscosity | Occurrence frequency of cutting failure (%) | Re (nm) | Rth (nm) | Thickness (μm) | Tg (°C.) |
| Present invention 1 | 200 | 0.3 | 0.5 | 0 | 0 | 0 | 80 | 120 |
| Present invention 2 | 200 | 0.5 | 0.7 | 0 | 0 | 0 | 80 | 120 |
| Present invention 3 | 200 | 0.1 | 0.2 | 0 | 0 | 0 | 80 | 120 |
| Present invention 4 | 200 | 1.1 | 1.5 | 4 | 0 | 0 | 80 | 120 |
| Present invention 5 | 200 | 0.1 | 0.3 | 0 | 0 | 0 | 80 | 120 |
| Present invention 6 | 200 | 0.5 | 0.8 | 0 | 0 | 0 | 80 | 120 |
| Present invention 7 | 200 | 1.2 | 1.6 | 5 | 0 | 0 | 80 | 120 |
| Present invention 8 | 200 | 0.5 | 0.8 | 0 | 0 | 0 | 80 | 120 |
| Present invention 9 | 200 | 0.3 | 0.5 | 0 | 0 | 0 | 80 | 120 |
| Present invention 10 | 200 | 1.2 | 1.8 | 6 | 0 | 0 | 80 | 120 |
| Present invention 11 | 200 | 0.5 | 0.8 | 0 | 0 | 0 | 80 | 120 |
| Present invention 12 | 200 | 0.3 | 0.5 | 0 | 0 | 0 | 80 | 120 |
| present invention 13 | 200 | 1.3 | 1.4 | 6 | 0 | 0 | 80 | 120 |
| Comparative example 1 | 200 | 2.2 | 3.2 | 35 | 0 | 0 | 80 | 120 |
| Present invention 14 | 200 | 1.8 | 2.8 | 8 | 0 | 0 | 80 | 120 |
| Present invention 15 | 200 | 1.4 | 1.5 | 6 | 0 | 0 | 80 | 120 |
| Present invention 16 | 200 | 0.3 | 0.5 | 0 | 0 | 0 | 80 | 120 |

TABLE 2-continued

| | | | | | | | | |
|---|---|---|---|---|---|---|---|---|
| Present invention 17 | 100 | 0.7 | 0.9 | 1 | 0 | 0 | 200 | 120 |
| Present invention 18 | 900 | 0.8 | 0.8 | 1 | 0 | 0 | 200 | 120 |
| Present invention 19 | 600 | 1.2 | 1.6 | 6 | 18 | 75 | 120 | 140 |
| Present invention 20 | 400 | 0.9 | 0.9 | 3 | 8 | 35 | 120 | 135 |
| Present invention 21 | 300 | 0.5 | 0.7 | 1 | 0 | 0 | 120 | 110 |
| Present invention 22 | 150 | 0.5 | 0.7 | 1 | 0 | 0 | 120 | 105 |
| Present invention 23 | 300 | 0.5 | 0.7 | 1 | 0 | 0 | 120 | 110 |
| Present invention 24 | 150 | 0.3 | 0.5 | 0 | 4 | 10 | 40 | 115 |
| Present invention 25 | 200 | 0.5 | 0.7 | 1 | 7 | 15 | 40 | 110 |
| Present invention 26 | 150 | 0.5 | 0.7 | 1 | 5 | 10 | 100 | 120 |
| Present invention 27 | 200 | 0.5 | 0.8 | 1 | 0 | 0 | 100 | 100 |
| Present invention 28 | 200 | 0.8 | 1.2 | 2 | 5 | 5 | 100 | 95 |
| Present invention 29 | 300 | 0.4 | 0.6 | 0 | 0 | 0 | 80 | 120 |
| Comparative example 2 | 300 | 2.5 | 3.5 | 45 | 0 | 0 | 80 | 120 |

| | Drawn film | | | | Polarizing plate | |
|---|---|---|---|---|---|---|
| | Draw ratio | Occurrence frequency of | | | | Occurrence probability of cutting |
| | MD (%) | TD (%) | cutting failure (%) | Re (nm) | Rth (nm) | Composition | failure (%) |
| Present invention 1 | 5 | 45 | 0 | 70 | 230 | A | 0 |
| Present invention 2 | 5 | 45 | 0 | 70 | 230 | A | 0 |
| Present invention 3 | 5 | 45 | 0 | 70 | 230 | A | 0 |
| Present invention 4 | 5 | 45 | 5 | 70 | 230 | A | 7 |
| Present invention 5 | 30 | 90 | 0 | 100 | 350 | B | 0 |
| Present invention 6 | 30 | 90 | 0 | 100 | 350 | B | 0 |
| Present invention 7 | 30 | 90 | 6 | 100 | 350 | B | 7 |
| Present invention 8 | 70 | 10 | 0 | 90 | 280 | C | 0 |
| Present invention 9 | 70 | 10 | 0 | 90 | 280 | C | 0 |
| Present invention 10 | 70 | 10 | 7 | 90 | 280 | C | 8 |
| Present invention 11 | 3 | 200 | 0 | 150 | 330 | D | 0 |
| Present invention 12 | 3 | 200 | 0 | 150 | 330 | D | 0 |
| present invention 13 | 3 | 200 | 6 | 150 | 330 | D | 7 |
| Comparative example 1 | 80 | 150 | 38 | 100 | 300 | E | 40 |
| Present invention 14 | 80 | 150 | 9 | 100 | 300 | E | 9 |
| Present invention 15 | 80 | 150 | 7 | 100 | 300 | E | 8 |
| Present invention 16 | 80 | 150 | 0 | 100 | 300 | E | 0 |
| Present invention 17 | 0 | 300 | 2 | 200 | 500 | A | 2 |
| Present invention 18 | 0 | 300 | 1 | 200 | 500 | A | 1 |
| Present invention 19 | 10 | 60 | 6 | 120 | 300 | B | 7 |
| Present invention 20 | 10 | 60 | 3 | 100 | 270 | B | 3 |
| Present invention 21 | 10 | 60 | 1 | 90 | 200 | B | 1 |
| Present invention 22 | 10 | 60 | 1 | 60 | 200 | B | 1 |
| Present invention 23 | 10 | 60 | 1 | 60 | 200 | B | 1 |
| Present invention 24 | 10 | 30 | 0 | 30 | 100 | A | 0 |
| Present invention 25 | 10 | 30 | 1 | 30 | 110 | A | 1 |
| Present invention 26 | 5 | 50 | 1 | 140 | 300 | B | 1 |
| Present invention 27 | 5 | 50 | 1 | 100 | 200 | B | 1 |
| Present invention 28 | 5 | 15 | 2 | 15 | 50 | B | 2 |
| Present invention 29 | 50 | 50 | 0 | 20 | 280 | D | 0 |
| Comparative example 2 | 50 | 50 | 49 | 20 | 280 | D | 52 |

The shear rate dependency of the melt viscosity, the temperature dependency of the melt viscosity, Re, Rth, the quantity of the remaining sulfuric acid, the content ratio of Na, and Tg (measured by the following method) of the obtained cellulose acylate are obtained and described in Table 2.

(Tg Measurement)

A 20 mg of sample was put into a measurement pan of DSC. This was heated from 30° C. to 250° C. for 10° C. ($1^{st}$-run) and was cooled to 30° C. for −10° C. in nitrogen stream. Thereafter, this is heated from 30° C. to 250° C. for 10° C. ($2^{nd}$-run). The Tg obtained by $2^{nd}$-run (temperature in which a base line starts to be biased from a lower temperature) was described in Table 2.

In addition, this film was cut by 1000 m using a rotation blade, 100 places were observed by an actual microscope every 10 m, the number of places where crack or chip occurs was counted, and the frequency thereof was expressed by % and described in Table 1 (chip is detached and becomes cutting wastage). The cutting was performed at low humidity (25° C. and relative humidity of 10%) which is an extreme condition.

The film according to the present invention had a good cutting property. By setting the 6-position acylation ratio, the quantity of remaining sulfuric acid, the content ratio of carboxylic acid, and the content ratio of Na to the above range, the cutting property is improved. Even when each of the conditions is satisfied, the effect is realized. However, when at least two of the conditions are satisfied, the synergetic effect is obtained (present invention 19 to 23). In Comparative example 2 in which a film is manufactured based on sample No. 6 of Example 1 of Japanese Unexamined Patent Publication No. 2000-352620, a cutting failure and crack occurred. In contrast, the present invention 29 using the cellulose acylate having the same composition had good capability.

(4) Drawing

The obtained cellulose acylate film was drawn by a magnification ratio described Table 1 at Tg+15° C. Thereafter, the both ends of the film were trimmed by 5%. Re, Rth and cutting wastage were measured by the above method and were described in Table 2. The present invention had a good cutting property even after drawing. The cutting was performed at low humidity (25° C. and relative humidity of 10%) which is an extreme condition.

(5) Construction of Polarizer:

(5-1) Saponification of Cellulose Acylate Film:

The unstretched cellulose acylate film and the stretched cellulose acylate film were saponificated for surface hydrophilication according to the following dipping saponification method. In addition, the following coating saponification made on the films gave the same results as in the dipping saponification.

(i) Coating Saponification:

20 parts by weight of water was added to 80 parts by weight of iso-propanol, and KOH was dissolved therein to have a concentration of 2.5 mol/L. This was conditioned at 60° C. and used as a saponification solution. This was applied to the cellulose acylate film at 60° C. in an amount of 10 g/m$^2$, and the film was thus saponified for 1 minute. Next, this was washed by spraying thereon hot water at 50° C. in a degree of 10 L/m$^2$ min for 1 minute.

(ii) Dipping Saponification:

An aqueous NaOH (2.5 mol/L) solution was prepared as a saponification solution, and conditioned at 60° C. The cellulose acylate film was dipped in the solution for 2 minutes. Next, this was dipped in an aqueous sulfuric acid (0.05 mol/L) solution for 30 seconds, and then led to pass through a water-washing bath.

(5-2) Preparation of Polarizing Film:

According to Example 1 in JP-A-2001-141926, a film was stretched in the machine direction, between two pairs of nip rolls having a different peripheral speed to prepare a polarizing film having a thickness of 20 μm.

(5-3) Bonding

The polarizing plate obtained in this manner, and any one of the saponified, unstretched or stretched cellulose acylate films were bonded together by using an aqueous 3% PVA (PVA-117H, produced by KURARAY CO., LTD.) solution as an adhesive, in such a manner that the polarization axis could cross the length direction of the cellulose acylate film at parallel (selected polarizing plate was described in table 2).

Polarizing plate A: Undrawn cellulose acylate film/polarizer/TD80U

Polarizing plate B: Undrawn cellulose acylate film/polarizer/undrawn cellulose acylate film Polarizing plate C: Drawn cellulose acylate film/polarizer/TD80U Polarizing plate D: Drawn cellulose acylate film/polarizer/undrawn cellulose acylate film Polarizing plate E: Drawn cellulose acylate film/polarizer/drawn cellulose acylate film The "TD80U" is a triacetyl cellulose film made by FUJIFILM Corporation, which was coated and saponified.

(5-4) Evaluation of Cutting Property

Five polarizing plates were overlapped, 100 polarizing plates were punched by a Thomson blade of 10 cm square, the end sections of the corners were observed by a microscope, and a probability that chip and crack occurs was obtained and described in Table 2. The present invention had good capability. The cutting was performed at low humidity (25° C. and relative humidity of 10%) which is an extreme condition.

The polarizing plate and the cellulose acylate film were bonded such that the longitudinal directions of a polarization axis and the cellulose acylate film are orthogonal or 45° and were evaluated. The same result as when the polarizing plate and the cellulose acylate film were bonded such that the longitudinal directions of a polarization axis and the cellulose acylate film are equal was obtained.

(6) Manufacture of Optical Compensatory Film and Liquid Crystal Display Device

A viewer-side polarizing plate provided on a 22-inch liquid crystal display device (made by Sharp Corporation) using a VA-type liquid crystal cell was removed. The polarizing plate was removed in retardation polarizing plates A and B and the polarizing plate and the retardation plate were removed in the polarizing plates C, D and E. The cellulose acylate film was bonded to the viewer side using an adhesive to become the liquid crystal cell side. The liquid crystal display device was manufactured by positioning the polarizing plates such that the transmission axis of the viewer-side polarizing plate is orthogonal to that of a backlight-side polarizing plate.

The entire surface of the device was displayed in white, and the number of points having a spot shape was counted by cutting wastage, converted into a unit area, and shown in Table 2. The present invention is good without a spot.

When the stretched cellulose acylate film of the invention was used in place of the liquid-crystal layer-coated cellulose acetate film in Example 1 in JP-A-11-316378, then good optical compensatory films were produced.

Similarly, when the cellulose acylate film of the invention was used in place of the liquid-crystal layer-coated cellulose acetate film in Example 1 in JP-A-7-333433, then good optical compensatory filter films can be obtained.

A liquid crystal display device having an excellent visuality and no display unevenness associated with a heat and humidity can be obtained after the polarizing plate and the retardation polarizing plate according to the invention were used for a liquid crystal display device described in Example 1 in JP-A-10-48420, an optically anisotropic layer including discotic liquid crystal molecules and an alignment film to which polyvinyl alcohol is applied described in Example 1 in JP-A-9-26572, a 20-inch VA-type liquid crystal display device described in FIGS. 2 to 9 in JP-A-2000-154261, a 20-inch OCB-type liquid crystal display device described in FIGS. 10 to 15 in JP-A-2000-154261 and a IPS-type liquid crystal display device described in FIG. 11 in JP-A-2004-12731.

(7) Construction of Low-Refractivity Film

According to Example 47 in Hatsumei Kyokai Disclosure Bulletin (No. 2001-1745), the low-refractivity films stretched was constructed, and the cutting property of the low-refractivity films was evaluated like above mentioned polarizing plates with being punched by a Thomson blade. The films of the invention had good optical properties like the low-refractivity films were evaluated.

The low-refractivity film of the invention was stuck to the outermost surface layer of the liquid-crystal device of Example 1 in JP-A-10-48420, the 20-inch VA-mode liquid-crystal display device of FIGS. 2 to 9 in JP-A-2000-154261, and the 20-inch OCB-mode liquid-crystal display device of FIGS. 10-15 in JP-A-2000-154261, and the devices were tested. They were all good.

Example 2

(1) Manufacture of Raw Material

Similar to Example 1, the cellulose acylates having the substitution degrees and the polymerization degrees of Table 3 were manufactured. In addition, similar to Example 1, the quantity of the remaining sulfuric acid, the quantity of carboxylic acid and the content ratio of Na are shown in Table 3. However, in the present Example, a plasticizing agent and an optical adjuster were not added. The melting properties of the obtained cellulose acylates were shown in Table 3.

(2) Melt-casting Film Formation

The cellulose acylates were dried for 5 hours at 100° C. using dehumidification airstream having a dew-point temperature of −40° C. such that the percentage of water content is 0.01% by mass or less. These were put into a hopper of 80° C. and were molten by a melt extruder adjusted from 180° C. (inlet temperature) to 230° C. (outlet temperature). The diameter of a screw used herein was 60 mm, L/D=50, and a compression ratio was 4. A predetermined quantity of resin extruded from the melt extruder was measured by a gear pump and was transferred. At this time, the number of rotations of the extruder was changed such that the pressure of resin before the gear pump is controlled to be a predetermined pressure of 10 MPa. The melt resin transferred from the gear pump was filtered by a leaf disc filter having filtering precision of 5 μmm and was extruded from a hanger coat die having a slit gap of 0.8 mm and 230° C. onto cast rolls having 115° C., 120° C., and 110° C. via a static mixer, a touch roll was in contact with an uppermost stream cast roll under the condition described in Table 3, thereby manufacturing a undrawn film (see FIG. 1). The touch roll (double control roll) disclosed in Example 1 of Japanese Unexamined Patent Publication No. 11-235747 was used as the touch roll (The thickness of a thin metallic outer tube was 3 mm). The properties of the undrawn films were measured similar to Example 1 and was shown in Table 4.

The undrawn films were drawn by magnification ratios described in Table 4 at (Tg+15° C.). Thereafter, the both ends of the film were trimmed by 5%. Re, Rth and cutting wastage thereof were measured by the above method and were described in Table 4. The present invention had a good cutting property even after drawing. The cutting was performed at low humidity (25° C. and relative humidity of 10%) which is an extreme condition. The cutting was performed at a low temperature and low humidity (10° C. and relative humidity of 10%) which is a more extreme condition. The films formed using the touch roll had good cutting properties even in any condition.

With respect to the cellulose acylate films described in Tables 3 and 4, an optical compensatory film, a low reflection film, and a liquid crystal display device were manufactured similar to Example 1 and good capabilities are obtained.

In addition, films were formed using a touch roll similar to the touch roll (sheet forming roll) of a first Example of WO1997/28950 (cooling water used in a metallic outer tube was replaced with oil having a temperature of 18° C. to 120° C.) under the condition described in Table 3 and were drawn. The occurrence frequency of cutting failures was reduced to 5% or less even in a condition having 25° C. and relative humidity of 10% or a condition having 10° C. and relative humidity of 10% and were reduced to 50% or less compared with a case where the touch roll is not used. When an optical compensatory film, a low reflection film, and a liquid crystal display device were manufactured using these films, good results were obtained, similar to Example 1.

Even with respect to the present invention 1 to 29 described in Tables 1 and 2, films were formed using the touch roll under the conditions b to e of the present invention. At this time, good cutting properties were obtained similar to Table 3. That is, the occurrence frequency of cutting failures was reduced to 5% or less even in a condition having 25° C. and relative humidity of 10% or a condition having 10° C. and relative humidity of 10% and were reduced to 50% or less compared with a case where the touch roll is not used. When an optical compensatory film, a low reflection film, and a liquid crystal display device were manufactured by drawing these films, good results were obtained, similar to Example 1.

TABLE 3

| | Cellulose acylate | | | | | | Other composition |
|---|---|---|---|---|---|---|---|
| | Substitution degree | | | | | | Amount of |
| | Acetyl group (X) | propionyl group (Y1) | butyryl group (Y2) | Sum of Y (Y1~2) | X + Y | 6-position acylation degree | Polymerization degree | remainig sulfuric acid (ppm) |
| Present invention a | 0.4 | 2.5 | | 2.5 | 2.9 | 0.97 | 160 | 40 |
| Present invention b | 0.4 | 2.5 | | 2.5 | 2.9 | 0.97 | 160 | 40 |
| Present invention c | 0.4 | 2.5 | | 2.5 | 2.9 | 0.97 | 160 | 40 |
| Present invention d | 0.4 | 2.5 | | 2.5 | 2.9 | 0.97 | 160 | 40 |
| Present invention e | 0.4 | 2.5 | | 2.5 | 2.9 | 0.97 | 160 | 40 |
| Present invention f | 0.4 | 2.5 | | 2.5 | 2.9 | 0.97 | 160 | 40 |
| Present invention g | 0.4 | 2.5 | | 2.5 | 2.9 | 0.97 | 160 | 40 |
| Present invention h | 0.4 | 2.5 | | 2.5 | 2.9 | 0.97 | 160 | 40 |
| Present invention i | 0.4 | 2.5 | | 2.5 | 2.9 | 0.97 | 160 | 40 |
| Present invention j | 0.4 | 2.5 | | 2.5 | 2.9 | 0.97 | 160 | 40 |
| Present invention k | 0.4 | 2.5 | | 2.5 | 2.9 | 0.97 | 160 | 40 |
| Present invention l | 1.1 | | 1.7 | 1.7 | 2.8 | 0.95 | 180 | 60 |
| Present invention m | 1.1 | | 1.7 | 1.7 | 2.8 | 0.95 | 180 | 60 |

| | Other composition | | | Melt property | | | Touch roll | |
|---|---|---|---|---|---|---|---|---|
| | Carboxylic acid | | Content of Na (ppm) | Melt viscosity (pa·s) | Shear rate dependency of melt viscosity | Temperature dependency of melt viscosity | Linear load (kg/cm) | Temperature (° C.) |
| | Type | Content (ppm) | | | | | | |
| Present invention a | P | 150 | 20 | 300 | 0.2 | 0.4 | Without touch roll | |
| Present invention b | P | 150 | 20 | 300 | 0.2 | 0.4 | 3 | 120 |
| Present invention c | P | 150 | 20 | 300 | 0.2 | 0.4 | 10 | 120 |

TABLE 3-continued

| | | | | | | | | |
|---|---|---|---|---|---|---|---|---|
| Present invention d | P | 150 | 20 | 300 | 0.2 | 0.4 | 50 | 120 |
| Present invention e | P | 150 | 20 | 300 | 0.2 | 0.4 | 95 | 120 |
| Present invention f | P | 150 | 20 | 300 | 0.2 | 0.4 | 105 | 120 |
| Present invention g | P | 150 | 20 | 300 | 0.2 | 0.4 | 20 | 55 |
| Present invention h | P | 150 | 20 | 300 | 0.2 | 0.4 | 20 | 65 |
| Present invention i | P | 150 | 20 | 300 | 0.2 | 0.4 | 20 | 100 |
| Present invention j | P | 150 | 20 | 300 | 0.2 | 0.4 | 20 | 150 |
| Present invention k | P | 150 | 20 | 300 | 0.2 | 0.4 | 20 | 170 |
| Present invention l | B | 250 | 40 | 400 | 0.4 | 0.7 | Without touch roll | |
| Present invention m | B | 250 | 40 | 400 | 0.4 | 0.7 | 10 | 115 |

2) Type of carboxylic acid: B: butyric acid, P: propionic acid.

TABLE 4

| | Undrawn film | | | | | | | | Drawn film | | | | | Polarizing plate | | |
|---|---|---|---|---|---|---|---|---|---|---|---|---|---|---|---|---|
| | Occurrence frequency of cutting failure | | | | | | | | | Occurrence frequency of cutting failure | | | | | Occurrence frequency of cutting failure | | |
| | 25° C. | 10° C. | | | | | | Draw ratio | 25° C. | 10° C. | | | | | 25° C. | 10° C. | |
| | 10% RH (%) | 10% RH (%) | Re (nm) | Rth (nm) | Thickness (μm) | Tg (° C.) | MD (%) | TD (%) | 10% RH (%) | 10% RH (%) | Re (nm) | Rth (nm) | Composition | 10% RH (%) | 10% RH (%) | |
| Present invention a | 2 | 6 | 0 | 0 | 80 | 125 | 5 | 50 | 3 | 7 | 60 | 200 | A | 4 | 8 | |
| Present invention b | 0 | 2 | 1 | 1 | 80 | 125 | 5 | 50 | 1 | 2 | 60 | 205 | A | 1 | 3 | |
| Present invention c | 0 | 0 | 1 | 1 | 80 | 125 | 5 | 50 | 0 | 0 | 60 | 205 | A | 0 | 0 | |
| Present invention d | 0 | 0 | 1 | 1 | 80 | 125 | 5 | 50 | 0 | 0 | 65 | 205 | A | 0 | 0 | |
| Present invention e | 0 | 1 | 1 | 1 | 80 | 125 | 5 | 50 | 1 | 1 | 65 | 210 | A | 1 | 1 | |
| Present invention f | 1 | 2 | 2 | 7 | 80 | 125 | 5 | 50 | 2 | 2 | 70 | 220 | A | 3 | 3 | |
| Present invention g | 1 | 2 | 0 | 1 | 80 | 125 | 5 | 50 | 1 | 2 | 60 | 205 | A | 2 | 3 | |
| Present invention h | 0 | 0 | 1 | 1 | 80 | 125 | 5 | 50 | 0 | 1 | 60 | 205 | A | 1 | 1 | |
| Present invention i | 0 | 0 | 1 | 1 | 80 | 125 | 5 | 50 | 0 | 0 | 60 | 210 | A | 0 | 0 | |
| Present invention j | 0 | 1 | 1 | 1 | 80 | 125 | 5 | 50 | 0 | 1 | 60 | 215 | A | 0 | 2 | |
| Present invention k | 1 | 2 | 1 | 2 | 80 | 125 | 5 | 50 | 1 | 3 | 65 | 225 | A | 1 | 4 | |
| Present invention l | 3 | 8 | 0 | 0 | 80 | 120 | 10 | 70 | 4 | 9 | 70 | 220 | B | 5 | 9 | |
| Present invention m | 0 | 0 | 1 | 2 | 80 | 120 | 10 | 70 | 0 | 0 | 75 | 225 | B | 0 | 0 | |

The invention claimed is:

1. A method for producing a cellulose acylate film which comprises melting a composition comprising cellulose acylate having a polymerization degree of 100 to 400, and extruding the molten composition through a die to form a cellulose acylate film having a shear rate dependency of melt viscosity of 0.1 to 2.

2. The method for producing a cellulose acylate film according to claim 1, wherein the cellulose acylate satisfies at least one of the conditions [A] to [E] below;
   [A] the cellulose acylate has a 6-position acyl substitution degree of 0.9 or more,
   [B] the cellulose acylate satisfies following Formulae (1) to (3):

$$2.0 \leq X+Y \leq 3.0 \quad \text{Formula (1)}$$

$$0 \leq X \leq 1.8 \quad \text{Formula (2)}$$

$$1.2 \leq Y \leq 2.9 \quad \text{Formula (3)}$$

where, in Formulae (1) to (3), X represents a substitution degree for an acetyl group, and Y represents the sum of substitution degrees for a propionyl group, a butyryl group, a pentanoyl group, and a hexanoyl group,
   [C] the cellulose acylate comprises a sulfuric acid in an amount of 0 to 100 ppm,
   [D] the cellulose acylate comprises at least one of acetic acid, propionic acid, butyric acid and valeric acid in an amount of 1 ppm to 500 ppm, and
   [E] the cellulose acylate comprises an alkali metal ion in an amount of 1 ppm to 200 ppm.

3. The method for producing a cellulose acylate film according to claim 2, which further comprises applying static electricity to the composition on the casting drum.

4. The method for producing a cellulose acylate film according to claim 1, wherein the composition extruded through the die is solidified on a casting drum.

5. The method for producing a cellulose acylate film according to claim 1, which further comprises cutting the formed film.

6. The method for producing a cellulose acylate film according to claim 1, which is produced by a melt-casting film formation with use of a touch roll.

7. A method for producing a cellulose acylate film which comprises melting a composition comprising cellulose acylate having a polymerization degree of 100 to 400, and extruding the molten composition through a die to form a cellulose acylate film having a temperature dependency of melt viscosity of 0.1 to 3.

8. The method for producing a cellulose acylate film according to claim 7, wherein the cellulose acylate satisfies at least one of the conditions [A] to [E] below;
   [A] the cellulose acylate has a 6-position acyl substitution degree of 0.9 or more,
   [B] the cellulose acylate satisfies following Formulae (1) to (3):

$$2.0 \leq X+Y \leq 3.0 \quad \text{Formula (1)}$$

$$0 \leq X \leq 1.8 \quad \text{Formula (2)}$$

$$1.2 \leq Y \leq 2.9 \quad \text{Formula (3)}$$

where, in Formulae (1) to (3), X represents a substitution degree for an acetyl group, and Y represents the sum of substitution degrees for a propionyl group, a butyryl group, a pentanoyl group, and a hexanoyl group,
   [C] the cellulose acylate comprises a sulfuric acid in an amount of 0 to 100 ppm,
   [D] the cellulose acylate comprises at least one of acetic acid, propionic acid, butyric acid and valeric acid in an amount of 1 ppm to 500 ppm, and
   [E] the cellulose acylate comprises an alkali metal ion in an amount of 1 ppm to 200 ppm.

9. The method for producing a cellulose acylate film according to claim 8, which further comprises applying static electricity to the composition on the casting drum.

10. The method for producing a cellulose acylate film according to claim 7, wherein the composition extruded through the die is solidified on a casting drum.

11. The method for producing a cellulose acylate film according to claim 7, which further comprises cutting the formed film.

12. The method for producing a cellulose acylate film according to claim 7, which is produced by a melt-casting film formation with use of a touch roll.

* * * * *